US010401650B2

(12) United States Patent
Kaga et al.

(10) Patent No.: US 10,401,650 B2
(45) Date of Patent: Sep. 3, 2019

(54) SPECTACLE LENS, MANUFACTURING METHOD, SUPPLY SYSTEM, AND SUPPLY PROGRAM THEREOF

(71) Applicant: HOYA LENS THAILAND LTD., Prachatipat, Thanyaburi, Patumthani (TH)

(72) Inventors: Tadashi Kaga, Tokyo (JP); Ayumu Ito, Tokyo (JP); Kazuma Kozu, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 0 days.

(21) Appl. No.: 15/539,862

(22) PCT Filed: Dec. 28, 2015

(86) PCT No.: PCT/JP2015/086530
§ 371 (c)(1),
(2) Date: Jun. 26, 2017

(87) PCT Pub. No.: WO2016/104811
PCT Pub. Date: Jun. 30, 2016

(65) Prior Publication Data
US 2017/0351116 A1    Dec. 7, 2017

(30) Foreign Application Priority Data

Dec. 26, 2014    (JP) ................. 2014-266557

(51) Int. Cl.
*G02C 7/06*    (2006.01)
*G02C 7/02*    (2006.01)
*G02C 7/14*    (2006.01)

(52) U.S. Cl.
CPC ............. *G02C 7/063* (2013.01); *G02C 7/02* (2013.01); *G02C 7/024* (2013.01); *G02C 7/027* (2013.01);
(Continued)

(58) Field of Classification Search
CPC . G02C 7/02; G02C 7/024; G02C 7/27; G02C 7/06; G02C 7/061; G02C 7/63; G02C 7/65; G02C 7/14
(Continued)

(56) References Cited

U.S. PATENT DOCUMENTS 6,129,435 A    10/2000  Reichow et al.
6,832,834 B2   12/2004  Haimerl et al.
(Continued)

FOREIGN PATENT DOCUMENTS

JP    H11-295670 A    10/1999
JP    2002-511594 A    4/2002
(Continued)

OTHER PUBLICATIONS

Jun. 27, 2017 International Preliminary Report on Patentability issued in International Patent Application No. PCT/JP2015/086530.
(Continued)

*Primary Examiner* — Stephone B Allen
*Assistant Examiner* — Travis S Fissel
(74) *Attorney, Agent, or Firm* — Oliff PLC

(57) ABSTRACT

A technology concerns a spectacle lens to suppress unnecessary convergence. In the spectacle lens, when an inner horizontal direction of the spectacle lens is a direction toward the nose of a user who wears the spectacle lens, and an outer horizontal direction of the spectacle lens is a direction toward an ear of the user, a shape of a base in prism is formed in a portion in which power continuously changes and through which a main line of sight, influenced by convergence of the user of the spectacle lens, passes such that at least a part of a base out prism, which may be generated in the portion, is cancelled.

17 Claims, 33 Drawing Sheets

(52) U.S. Cl.
CPC .............. *G02C 7/06* (2013.01); *G02C 7/061* (2013.01); *G02C 7/065* (2013.01); *G02C 7/14* (2013.01)

(58) Field of Classification Search
USPC ............ 351/159.01, 159.02, 159.05–159.22, 351/159.41–159.47, 159.52–159.54, 351/159.73, 159.74, 178
See application file for complete search history.

(56) References Cited

U.S. PATENT DOCUMENTS

| | | |
|---|---|---|
| 2006/0139571 A1 | 6/2006 | Poulain et al. |
| 2006/0170863 A1 | 8/2006 | Krall |
| 2007/0182923 A1* | 8/2007 | Kitani .................... G02C 7/028 351/159.42 |
| 2010/0245762 A1* | 9/2010 | Krall ...................... G02C 7/061 351/159.42 |
| 2012/0022985 A1* | 1/2012 | Yoshida ................. B24B 9/148 705/34 |

FOREIGN PATENT DOCUMENTS

| | | |
|---|---|---|
| JP | 2007-327984 A | 12/2007 |
| JP | 2008-529100 A | 7/2008 |
| WO | 2010/111113 A1 | 9/2010 |
| WO | 2013/123558 A1 | 8/2013 |

OTHER PUBLICATIONS

Mar. 8, 2016 Search Report issued in International Patent Application No. PCT/JP2015/086530.

Aug. 1, 2018 Search Report issued in European Patent Application No. 15873379.0.

* cited by examiner

EXAMPLE 4

SPECTACLE LENS, MANUFACTURING METHOD, SUPPLY SYSTEM, AND SUPPLY PROGRAM THEREOF

TECHNICAL FIELD

The present invention relates to a spectacle lens, a manufacturing method, a supply system, and a supply program thereof.

BACKGROUND ART

A spectacle lens having a portion in which power continuously changes (so-called corridor) is known. Such a spectacle lens also called a "progressive power lens", which has different types, for example, a progressive multifocal lens which includes a distance portion and a near portion, and a single vision lens of which power on the lens surface changes as departing from a region to view an object at a predetermined distance.

For example, in a progressive multifocal lens, a curve called the main line of sight or the meridian (hereafter called "main line of sight"), which is a reference when the power changes continuously, is set.

The main line of sight in this description refers to a line formed by points through which the line of sight passes in the spectacle lens when the user, wearing the spectacle lens, moves the line of sight from above to below. This main line of sight is the base when the spectacle lens is designed.

For example, the main line of sight is indicated in the spectacle lens in FIG. 1 of PTL 1. In PTL 2, it is suggested to determine the shape of the main line of sight considering various conditions on individual data of the specific user of the spectacle lens.

CITATION LIST

Patent Literature

[PTL 1] Japanese Patent Application Laid-Open No. H11-295670
[PTL 2] U.S. Pat. No. 6,832,834

SUMMARY OF INVENTION

Technical Problem

As depicted, for instance, in FIG. 1 of PTL 1 and FIG. 2 of PTL 2, with respect to the main line of sight of the spectacle lens from an upper part to a lower part, the main line of sight, from the upper part to the lower part of the spectacle lens, is deflected toward the nose of the user (inner horizontal direction) in the lower part of the spectacle lens. This is caused by the movement of the eyeballs which face the nose direction simultaneously when the lines of sight move from the upper part to the lower part (convergence eye movement). As the line of sight moves to a lower part, the line of sight is deflected inward, and the main line of sight also changes accordingly.

The main line of sight that is deflected inward means that the main line of sight is not always on the vertical line connecting the upper vertex and the lower vertex of the spectacle lens in the plan view of the spectacle lens. As a result, a prismatic effect, which the spectacle lens should not have, is exhibited.

This will be described with reference to FIG. 1. The distribution map on the left side of FIG. 1 expresses the surface mean power in an outer surface progressive power lens, of which object side surface (outer surface) is a progressive surface, and the eyeball side surface (inner surface) is a spherical surface, when the spherical power (S) is 0.00 D, the cylinder power (C) is 0.00 D, and the addition power (ADD) is 3.50 D. A horizontal sectional shape of the spectacle lens at each corresponding position of the distribution map is illustrated on the right side of the distribution map.

The point F is a point which is on the main line of sight, and exists in a distance portion (e.g. distance power measurement point). In the cross-sectional view of the spectacle lens sectioned at the horizontal line A-A' which passes through the point F, the gradient of the tangential line on the outer surface and the gradient of the tangential line on the inner surface, are approximately the same at the point F.

On the other hand, the point N is a point which is on the main line of sight, and exists in a near portion (e.g. near power measurement point). As mentioned above, the main line of sight deflects toward the nose (inner horizontal direction) in the near portion, due to the convergence eye movement. As a result, in the cross-sectional view of the spectacle lens sectioned at the horizontal line B-B' which passes through the point N, the point N deviates from the vertex of the spectacle lens in the cross-sectional view, and the gradient of the tangential line on the outer surface and the gradient of the tangential line on the inner surface become different at the point N. Because of the difference in gradients, the ray following the line of sight is refracted. In other words, in this example, if the main line of sight is set considering convergence, an unintended prism is generated on the main line of sight in the near portion of the spectacle lens.

Furthermore, this unintended prism is a base out prism which refracts the ray following the line of sight toward the ear of the user (outer horizontal direction). If an unintended base out prism is generated, the eyes of the user are subject to more intense convergence. This state will be described with reference to FIG. 2. FIG. 2 is a schematic top view depicting an influence from the base out prism on the user. When the user sees a near object, the eyeballs need not move excessively inward if base out prisms are not generated, as indicated by the broken lines. However, if the base out prisms are generated, the lines of sight must be solid lines in order to visually perceive the object. Then both eyeballs must excessively move inward, compared with the lines of sight indicated by the broken lines. This means that the eyes of the user are subject to more intense convergence. And this convergence may cause unnecessary fatigue to the user.

In a conventional spectacle lens which includes a portion where power changes continuously (e.g. corridor), a critical point is how the user accommodates their eyes in accordance with the distance between the object in front of the eyes of the user and the user (that is, the distance in the front-back directions). However, as a result of earnest studies by the inventors, it became known that the convergence of the user (the distance in the horizontal direction or left-right directions) may considerably influence user' comfort when wearing spectacle lenses.

In FIG. 1, the outer surface progressive power lens is illustrated as an example, but plus power is added from the upper part to the lower part, even in the case of an inner surface progressive power lens where the progressive surface is on the inner surface, a double-sided progressive power lens where the change in power is distributed on both surfaces, or a double-sided integrated progressive power lens where optimum design is implemented on a double-sided progressive power lens according to the characteristics of the eyes. Therefore unintended base out prisms can be generated in the portions through which the main line of sight, influenced by convergence of the user, passes, even in the inner surface progressive power lens, similarly to the case illustrated in FIG. 1, and this can also occur even in a single vision lens having plus power, where power changes while moving away from one region to view an object at a predetermined distance.

Now how the amount of convergence of an eyeball of the user is changed by the amount of unintended base out prism will be described.

For example, an approximate amount of eyeball convergence I (mm) of the user is determined using the following equation.

$$I=H/\{1\times(1/V-D/1000)+1\} \quad \text{(Equation 1)}$$

Here H is a monocular pupil distance (mm), 1 is a target distance (mm), V is a distance between vertexes (mm), and D is a power of a lens in the horizontal direction (D).

On the other hand, the unintended base out prism can be estimated by the following equation (Equation 2) based on a variation of The Prentice's Formula. Details on this variation will be described in the later mentioned (Equations 3 to 5).

$$P=ADD*h/10 \quad \text{(Equation 2)}$$

Here P is an amount of the prism ($\Delta$), h is a horizontal distance (mm) between the vertex of the horizontal sectional shape of the spectacle lens to a point on the main line of sight (e.g. point N in FIG. 1), and the absolute value of h corresponds to the amount of inset in the spectacle lens. The sign of h is positive on the nose side, and negative on the ear side with respect to the vertex of the spectacle lens in the horizontal sectional view (vertical line (perpendicular line) connecting the upper vertex and the lower vertex of the spectacle lens in this example), but a plus sign is hereafter omitted. The vertexes in the horizontal sectional shape of the spectacle lens are defined as points where a plane, which is orthogonal to the line passing through two engraving marks and which includes a mid-point of a line segment connecting the two engraving marks, crosses with the horizontal sectional shape. h at the point N in FIG. 1 is 2.51 mm.

As (Equation 2) shows, the amount of the unintended base out prism increases as the addition power (ADD) increases.

In the case of a user who wears a single vision lens of which S is 0.00 (distance prescription power), the amount of convergence required to see a near object 35 cm ahead can be estimated as 2.29 mm using (Equation 1), since the monocular pupil distance is 32 mm and the distance between the vertexes is 27 mm.

When the same user wears a progressive power lens of which S is 0.00 and ADD is 3.50 D, the amount of convergence required to see the near object 35 cm ahead is 2.51 mm if the power in the near portion of the lens in the horizontal direction is approximated as 3.50 D.

In other words, if ADD is 3.50 D, the amount of unintended base out prism increases compared with the case of no addition power, and as a result, the eyeballs must converge about 10% or more.

An object of the present invention is to provide a technology on a spectacle lens to suppress unnecessary convergence.

Solution to Problem

To solve the above mentioned problem, the present inventors performed diligent examination. As a result, the present inventors conceived of a configuration to provide the spectacle lens with a base in prism to refract a ray following the line of sight toward the nose of the user (inner horizontal direction), in order to cancel at least a part of the unintended base out prism.

Based on this information, the present invention has the following aspects.

A first aspect of the invention is a spectacle lens, wherein when an inner horizontal direction of the spectacle lens is a direction toward the nose of a user who wears the spectacle lens, and an outer horizontal direction of the spectacle lens is a direction toward an ear of the user, a shape of a base in prism is formed in a portion in which power continuously changes and through which a main line of sight influenced by convergence of the user of the spectacle lens passes, such that at least a part of a base out prism, which may be generated in the portion, is cancelled.

In a second aspect of the invention according to the first aspect, wherein when the user wears the spectacle lens, the upper direction of the spectacle lens is a direction of top of the spectacle lens, and the lower direction of the spectacle lens is a direction of bottom of the spectacle lens, the spectacle lens includes a portion for viewing an object at a specific distance, a near portion for viewing an object at a distance nearer than the specific distance, and a corridor which is between the portion and the near portion and in which the power changes, the spectacle lens satisfying the following equation:

$$P_N-P_F<ADD*h/10$$

where $P_F$ denotes an amount of prism ($\Delta$) at a power measurement point of the portion for viewing an object at a specific distance, and $P_N$ denotes an amount of prism ($\Delta$) at a near power measurement point. The amount of prism indicates a positive value in a case of a base out prism, and a negative value in a case of a base in prism.

ADD denotes an addition power (D), and h denotes an amount of inset (mm) in the spectacle lens, in which a positive direction is toward the nose and a negative direction is toward the ear, with respect to a vertical line connecting an upper vertex and a lower vertex of the spectacle lens.

In a third aspect of the invention according to the second aspect, wherein the spectacle lens satisfies the following equation:

$$|P_N-P_F-ADD*h/10|\geq0.25.$$

In a fourth aspect of the invention according to any one of the first to third aspects, when the user wears the spectacle lens, the upper direction of the spectacle lens is a direction of top of the spectacle lens, and the lower direction of the spectacle lens is a direction of bottom of the spectacle lens, at least a part of the portion of the spectacle lens includes a shape of continuously twisting at least a shape of one of an object side surface and an eyeball side surface of the spectacle lens in the horizontal cross-sectional view of the portion, in the lower direction of the spectacle lens, so that the amount of the base in prism increases in the lower direction.

In a fifth aspect of the invention according to the fourth aspect, wherein an absolute value of a difference between surface power values in the vertical direction in ±15 mm positions from a point through which the main line of sight passes is 0.25 D or more, on a horizontal line which is parallel with a line passing through two engraving marks of the spectacle lens, and which passes through any point on a line segment connecting a specific distance power measurement point and a near power measurement point.

In a sixth aspect of the invention according to the fifth aspect, wherein any point on the line segment connecting the specific distance power measurement point and the near power measurement point is located in a ±3 mm range in a perpendicular direction from the mid-point between the specific distance power measurement point and the near power measurement point.

In a seventh aspect of the invention according to the fourth aspect, wherein an absolute value of a difference between surface power values in the horizontal direction in ±5 mm positions from the point through which the main line of sight passes is 0.12 D or more, on a horizontal line which is parallel with a line passing through two engraving marks of the spectacle lens, and which passes through any point on a line segment connecting the specific distance power measurement point and the near power measurement point.

In an eighth aspect of the invention according to the seventh aspect, wherein any point on the line segment connecting the specific distance power measurement point and the near power measurement point is located in a ±3 mm range in the perpendicular direction from the mid-point between the specific distance power measurement point and the near power measurement point.

In a ninth aspect of the invention according to any one of the first to fourth aspects, wherein the shape of the base in prism is also formed in an outer part and inner part in the horizontal direction from the portion of the spectacle lens.

In a tenth aspect of the invention according to the ninth aspect, wherein when the user wears the spectacle lens, the upper direction of the spectacle lens is a direction of top of the spectacle lens, and the lower direction of the spectacle lens is a direction of bottom of the spectacle lens, an absolute value of a difference between surface power values in the vertical direction in ±15 mm positions from the point through which the main line of sight passes is 0.25 D or more, on a horizontal line which is parallel with a line passing through two engraving marks of the spectacle lens, and which passes through a point that is 3 mm higher in the vertical direction from the mid-point of the line segment connecting the specific distance power measurement point and the near power measurement point.

In an eleventh aspect of the invention according to the ninth aspect, wherein an absolute value of a difference between surface power values in the vertical direction in ±15 mm positions from the point through which the main line of sight passes is 0.25 D or more, on a horizontal line which is parallel with a line passing through two engraving marks of the spectacle lens, and which passes through a mid-point of the line segment connecting the specific distance power measurement point and the near power measurement point.

In A twelfth aspect of the invention according to the ninth aspect, wherein when the user wears the spectacle lens, the upper direction of the spectacle lens is a direction of top of the spectacle lens, and the lower direction of the spectacle lens is a direction of bottom of the spectacle lens, an absolute value of a difference between surface power values in the vertical direction in ±15 mm positions from the point through which the main line of sight passes is 0.25 D or more, on a horizontal line which is parallel with a line passing through two engraving marks of the spectacle lens, and which passes through a point that is 3 mm lower in the vertical direction from the mid-point of the line segment connecting the specific distance power measurement point and the near power measurement point.

In a thirteenth aspect of the invention according to any one of the first to fourth aspects, wherein the amount of the base in prism is decreased in the outer horizontal direction and inner horizontal direction from the portion of the spectacle lens.

In a fourteenth aspect of the invention according to the thirteenth aspect, wherein when the user wears the spectacle lens, the upper direction of the spectacle lens is a direction of top of the spectacle lens, and the lower direction of the spectacle lens is a direction of bottom of the spectacle lens, an absolute value of a difference between surface power values in the horizontal direction in ±5 mm positions from the point through which the main line of sight passes is 0.12 D or more, on a horizontal line which is parallel with a line passing through two engraving marks of the spectacle lens, and which passes through a point that is 3 mm lower in the vertical direction from the mid-point of the line segment connecting the specific distance power measurement point and the near power measurement point.

In a fifteenth aspect of the invention according to the thirteenth aspect, wherein an absolute value of a difference between surface power values in the horizontal direction in ±5 mm positions from the point through which the main line of sight passes is 0.12 D or more, on a horizontal line which is parallel with a line passes through two engraving marks of the spectacle lens, and which passes through a mid-point of the line segment connecting the specific distance power measurement point and the near power measurement point.

In a sixteenth aspect of the invention according to the thirteenth aspect, wherein when the user wears the spectacle lens, the upper direction of the spectacle lens is a direction of top of the spectacle lens, and the lower direction of the spectacle lens is a direction of bottom of the spectacle lens, an absolute value of a difference between surface power values in the horizontal direction in ±5 mm positions from the point through which the main line of sight passes is 0.12 D or more, on a horizontal line which is parallel with a line passing through two engraving marks of the spectacle lens, and which passes through a point that is 3 mm higher in the vertical direction from the mid-point of the line segment connecting the specific distance power measurement point and the near power measurement point.

A seventeenth aspect of the invention is a manufacturing method for a spectacle lens, the method including: when an inner horizontal direction of the spectacle lens is a direction toward the nose of a user who wears the spectacle lens, and an outer horizontal direction of the spectacle lens is a direction toward an ear of the user, a designing step of forming a shape of a base in prism in a portion in which power continuously changes and through which a main line of sight, influenced by convergence of the user of the spectacle lens, passes such that at least a part of a base out prism, which may be generated in the portion, is cancelled; and a manufacturing step of manufacturing the spectacle lens based on a result of the designing step.

An eighteenth aspect of the invention is a supply system of a spectacle lens, the supply system including: when an inner horizontal direction of the spectacle lens is a direction toward the nose of a user who wears the spectacle lens, and an outer horizontal direction of the spectacle lens is a direction toward an ear of the user, a receiving unit configured to receive information on the spectacle lens; a designing unit configured to form a shape of a base in prism in a portion in which power continuously changes and through which a main line of sight, influenced by convergence of the user of the spectacle lens, passes such that at least a part of a base out prism, which may be generated in the portion, is cancelled; and a transmitting unit configured to transmit design information that is acquired by the designing unit.

A nineteenth aspect of the invention is a supply program of a spectacle lens, to cause a computer to function as: when an inner horizontal direction of the spectacle lens is a direction toward the nose of a user who wears the spectacle lens, and an outer horizontal direction of the spectacle lens is a direction toward an ear of the user, a receiving unit configured to receive information on the spectacle lens; a designing unit configured to form a shape of a base in prism in a portion in which power continuously changes and through which a main line of sight, influenced by convergence of the user of the spectacle lens, passes such that at least a part of a base out prism, which may be generated in the portion, is cancelled; and a transmitting unit configured to transmit design information that is acquired by the designing unit.

Advantageous Effects of Invention

According to this invention, a technology on a spectacle lens to suppress unnecessary convergence can be provided.

DESCRIPTION OF EMBODIMENTS

Figure 1:
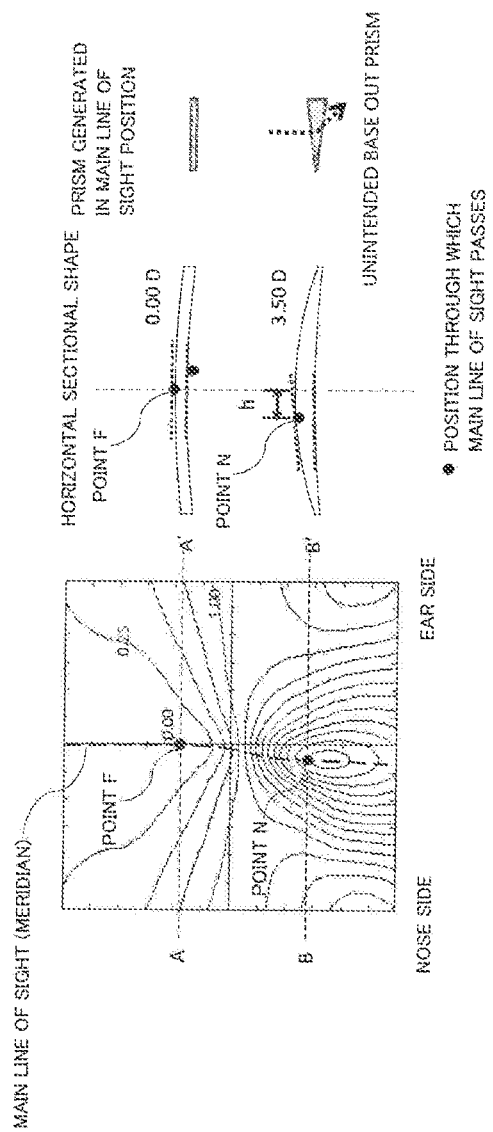
FIG. 1 The distribution map on the left of FIG. 1 expresses the surface mean power in an outer surface progressive power lens, of which the object side surface (outer surface) is a progressive surface and the eyeball side surface (inner surface) is a spherical surface, where the spherical power (S) is 0.00 D, the cylinder power (C) is 0.00 D, and the addition power (ADD) is 3.50 D; and the horizontal sectional view of the spectacle lens in each corresponding portion of the distribution maps is illustrated on the right side of the distribution map.

This embodiment will be described in the following sequence.

1. Spectacle lens
1-1. Configuration of spectacle lens
1-2. Difference from prior art
2. Design method (manufacturing method) of spectacle lens
2-1. Preparation step
2-2. Design step
2-3. Manufacturing step
3. Supply system of spectacle lens
3-1. Receiving unit
3-2. Designing unit
3-3. Transmitting unit
4. Supply program of spectacle lens
5. Effect of Embodiment
6. Modification In this description, the "horizontal direction" is the 0° or 180° direction in defining the astigmatic axis and the prism base direction, and an example, when the horizontal direction that matches with the direction of the horizontal reference line connecting two alignment reference marks (engraving marks) for fitting the lens into the frame, will be described. The horizontal reference line in this embodiment refers to a line that extends horizontally at a mid-point between the upper vertex and the lower vertex of the spectacle lens (lens before being fitted into the frame). In this embodiment, an example of disposing the engraving marks, so that the main line of sight passes through the center of the horizontal reference line connecting the two engraving marks, will be described.

<1. Spectacle Lens>

The spectacle lens according to this embodiment is a lens constituted by an object side surface (outer surface) and an eyeball side surface (inner surface). Unless otherwise specified, a configuration of a publically known spectacle lens may be used.

The spectacle lens according to this embodiment is not especially limited, as long as the spectacle lens has a portion in which power changes continuously (corridor). For example, the spectacle lens of this embodiment may be a progressive multifocal lens which includes a distance portion for viewing a distant area (e.g. infinity to 400 cm), and a near portion for viewing a near area (e.g. 100 cm or less), or a single vision lens which includes plus power in which power changes while moving away from one region to view an object at a predetermined distance.

To simplify description, an inner surface progressive power lens (outer surface is a spherical surface) of a progressive multifocal lens will be described as an example.

(1-1. Configuration of Spectacle Lens)

One major characteristic of this embodiment is that a shape of a base in prism for cancelling at least a part of a base out prism that may be generated in a portion of a corridor where a main line of sight, influence by the convergence of the user, passes through, is provided in this portion.

As mentioned above, the main line of sight is a line formed by points through which the line of sight passes in the spectacle lens. In this embodiment, the main line of sight in the progressive multifocal lens is defined as a line connecting the distance power measurement point and the near power measurement point (later mentioned in FIG. 3), to simplify description.

The target to be canceled in this embodiment is still "the base out prism, which may be generated in a portion of the spectacle lens where the power changes continuously, and through which the main line of sight, influenced by the convergence of the user, passes". In other words, the shape of the main line of sight (regardless a straight line or a curved line) is not limited as long as conditions are satisfied where convergence has been added to the main line of sight, and the main line of sight is not a vertical line (perpendicular line) connecting the upper vertex and the lower vertex of the lens. Considering that the shape of the main line of sight may change depending on the user, it is unnecessary to unequivocally specify the shape and position of the main line of sight itself.

Returning to the main topic, in this embodiment, even if an unintended base out prism is generated due to the deflection of the main line of sight toward the nose, the negative influence of the base out prism can be reduced by designing the spectacle lens to have a shape which allows to generate the base in prism in advance. In other words, by designing the shape of the spectacle lens to have a shape which allows to generate the base in prism in advance, the unintended base out prism, which may be generated due to convergence, can be cancelled out.

The above mentioned base in prism can suppress unnecessary convergence more than prior art if only a part of the base out prism can be cancelled. For example, 50% of the base out prism may be corrected by considering a balance with aberration. However, needless to say, the higher the ratio of cancelling the base out prism the better. It is preferable that the base in prism cancels the base out prism 80% or more (preferably 90% or more, ideally 95% or more).

The amount of the unintended base out prism which is generated in a portion through which the main line of sight, influenced by the convergence of the user, passes, can be estimated using The Prentice's Formula (Equation 2). The amount of the base in prism can be determined in accordance with the estimated amount of the base out prism, and the spectacle lens of this embodiment can be implemented by providing this amount of the base in prism to the spectacle lens.

The above content can be defined by the following equations.

Figure 3:
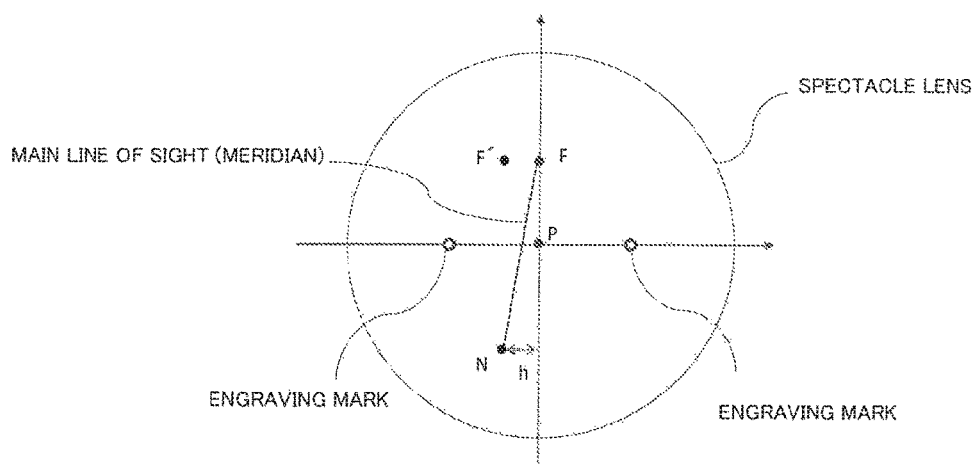
FIG. 3 is a schematic plan view of the spectacle lens according to this embodiment.

FIG. 3 is a schematic plan view of the spectacle lens according to this embodiment. The point F is the distance power measurement point, and the point N is the near power measurement point. h is the horizontal distance (mm) between the vertex of the horizontal sectional shape of the spectacle lens and a point on the main line of sight (e.g. point N in FIG. 1), as mentioned above, and is also the distance (mm) between the point F and the point N in the horizontal direction. The absolute value of h corresponds to the amount of inset in the spectacle lens. The point F' is a point that is distant from the point F in the horizontal direction by the distance h. In this embodiment, the amount of prism in the horizontal direction in the distance portion is measured at the point F', and the amount of prism in the horizontal direction in the near portion is measured at the point N. Thereby the prismatic effect that is generated by the distance power, which is prescribed separately from the addition power, can be cancelled. For this reason, in this embodiment, the equations to estimate the unintended base out prism are established using the amount of prism between the point F' and the point N.

First the amount of prism is determined at the point F' and the point N. For this, the above mentioned Prentice's Formula (Equation 2) is applied as follows.

$$P_F = D_F * h / 10 \qquad \text{(Equation 3)}$$

$$P_N = D_N * h / 10 \qquad \text{(Equation 4)}$$

Here $P_F$ denotes an amount of prism ($\Delta$) at the point F' and the point F, and $P_N$ denotes an amount of prism ($\Delta$) at the point N. The amount of prism is positive in the case of the base out prism, and negative in the case of the base in prism. In this description, however, the sign may be omitted, merely indicating either base in prism or base out prism. In this case, "the base out prism increases" means that the degree of the base out prism increases, and also means that "the absolute value of the amount of the base out prism increases".

$D_F$ denotes the power (D) of the distance portion in the horizontal direction, and $D_N$ denotes the power (D) of the near portion in the horizontal direction.

Here the unintended base out prism is given by $(P_N - P_F)$. Therefore in a conventional progressive multifocal lens which does not include a special prism, the following equation is established.

$$P_N - P_F = (D_N * h/10) - (D_F * h/10) \quad \text{(Equation 5)}$$
$$= (D_N - D_F) * h/10$$
$$= ADD * h/10$$

The amount of the unintended base out prism (Δ) can be estimated by (ADD*h/10). In other words, if ($P_N$–$P_F$), measured for an actual spectacle lens, is smaller than (ADD*h/10), this means that at least a part of the unintended base out prism has been cancelled. As a result, the spectacle lens of this embodiment can be specified by the following equation.

$$P_N - P_F < ADD * h/10 \quad \text{(Equation 6)}$$

In addition to (Equation 6), it is preferable to satisfy the following (Equation 7) as well.

$$|P_N - P_F - ADD * h/10| \geq 0.25 \quad \text{(Equation 7)}$$

The left hand side of (Equation 7) indicates the "degree of reduction of the unintended base out prism caused by addition of the base in prism". In other words, (Equation 7) indicates that the unintended base out prism has been cancelled by one step (0.25Δ) or more of the prescription prism. It is preferable that the left hand side of (Equation 7) is a value exceeding 0.25Δ.

If "a portion through which the main line of sight, influenced by the convergence of the user, passes" (hereafter called "portion α"), is specified in the spectacle lens according to this invention, although the following is a mere example, for instance in practical use, this portion may be a portion near a line segment connecting the distance power measurement point F and the near power measurement point N.

A specific shape of the spectacle lens in the portion α (specific shape of the inner surface in the portion α in this embodiment) is preferably as follows. In other words, in at least a part of the portion α, at least a shape of one of the object side surface and the eyeball side surface of the spectacle lens is continuously (gradually) twisted toward the lower part of the spectacle lens in the cross-sectional view of the portion α in the horizontal direction such that the amount of the base in prism increases toward the lower part of the spectacle lens.

Although details will be described later in the section on examples, compared with the optical layout of the progressive surface before considering the unintended base out prism (later mentioned Comparative Example 1 in FIGS. 8(a) and 8(b)), the inner shape of the spectacle lens in the cross-sectional view in the horizontal direction is continuously twisted toward the lower part of the spectacle lens, in a portion lower than the distance power measurement point F or the prism power measurement point P in Examples 1 to 3, and of these, the optical layout of Example 1 is illustrated in FIGS. 15(a) and 15(b) for explanatory purposes.

In comparing FIG. 15(b) of Example 1 and FIG. 8(b) of Comparative Example 1, the surface mean power is not very different. This is because even if the prism is added, the progressive surface is simply formed in the state of continuously changing the gradient of the tangential line at each point on the main line of sight in the horizontal sectional shape from the upper part to the lower part of the lens surface, and the mean power itself generated by the progressive surface does not change very much. However, because the surface shape is continuously twisted, the distribution map of the surface astigmatism depicted in FIG. 15(a) slightly deviates downward on the nose side in the case of Example 1. As a result, the distribution maps of the surface astigmatism are considerably different between Example 1 and Comparative Example 1.

Example 4 is the case when the shape (curve) of the spectacle lens of Example 1 is deformed on the side of the portion α, and Examples 5 and 6 are the cases when the manner of twisting the inner surface shape is changed under the same conditions as Example 4. Hereafter, Example 4 will be used for description. In Example 4, the curve itself is deformed on the side of the surface of the spectacle lens of Example 1, so that the amount of the base in prism on the side of the portion α can be kept low.

Therefore the surface astigmatism of the layout similar to the distribution map of the surface astigmatism of the progressive surface before considering the unintended base out prism (Comparative Example 1, FIG. 8(a)), can be acquired in the distribution map of the surface astigmatism in Example 4 (FIG. 18(a)). On the other hand, the near portion inclines toward the nose in the lower direction in the distribution map of the surface mean power in Example 4 (FIG. 18(b)), since the curve itself was deformed on the side of the surface.

The above content will be described below.

First the content according to Example 1 will be described. As mentioned above, the shape to generate the base in prism must be provided to the spectacle lens in order to cancel the unintended base out prism. To implement this, a difference must be generated between the gradient of the tangential line of the outer surface and the gradient of the tangential line of the inner surface at a point on the main line of sight, as depicted in FIG. 1, and these gradients must be generated in the direction to generate the base in prism.

Therefore according to a preferred example of this embodiment, the inner surface shape of the spectacle lens in the cross-sectional view in the horizontal direction is continuously twisted in the lower direction in the spectacle lens in the portion lower than the distance power measurement point F or the prism power measurement point P in the portion α, so that a difference is generated between the gradient of the tangential line of the outer surface and the gradient of the tangential line of the inner surface at a point on the main line of sight, as depicted in FIG. 1. In this case, on the inner surface of the spectacle lens, the tangential line at the point on the main line of sight is set so as to be lower on the nose side and higher on the ear side in the cross-sectional view in the horizontal direction. Then the base in prism can be continuously increased in the lower direction in the spectacle lens, and such a base in prism can be provided to the spectacle lens. This twisting shape is a shape considering that the main line of sight in this embodiment is gradually deflected toward the nose in the lower direction of the spectacle lens, because the convergence of the user is reflected.

Figure 4:
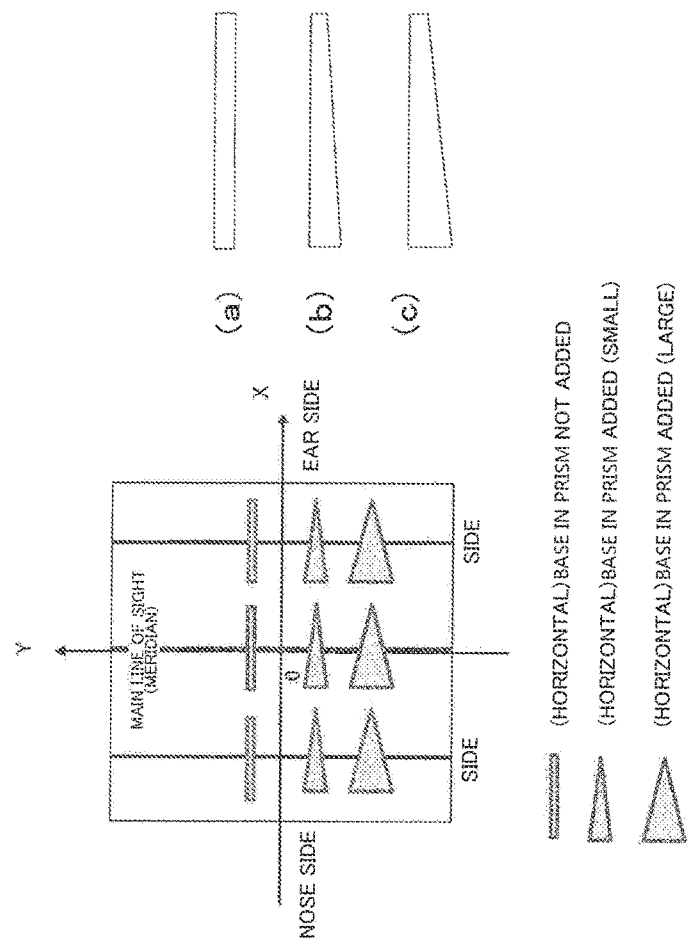
FIG. 4 is a conceptual diagram depicting the control state of the base in prisms in the portion α through which the main line of sight passes, and both sides thereof in the spectacle lens according to Example 1.
Figure 5:
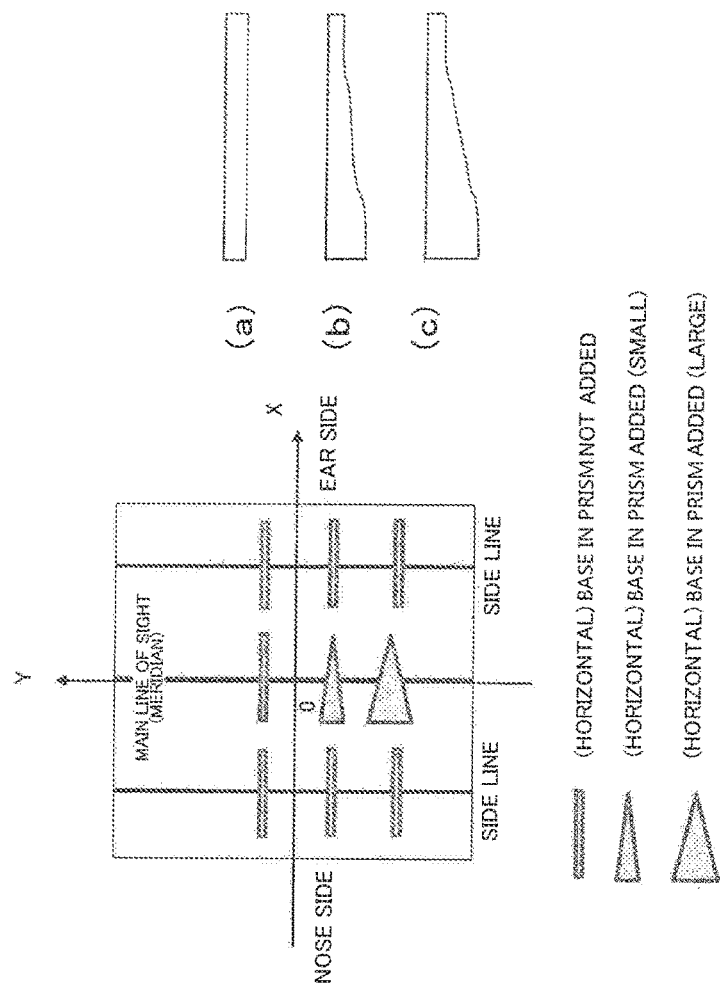
FIG. 5 is a conceptual diagram depicting the control state of the base in prisms in the portion α through which the main line of sight passes, and both sides thereof in the spectacle lens according to Example 2.

The above content is a description on the portion α. The shape of the portions other than the portion α will now be described with reference to FIG. 4 and FIG. 5. FIG. 4 and FIG. 5 are conceptual diagrams depicting: the control state of the base in prism in the portion α through which the main line of sight passes in the spectacle lens; and both sides thereof. To simplify description, the main line of sight is indicated as a straight line in FIG. 4 and FIG. 5. This visually presents the main line of sight along the Y axis, however this does not mean that the main line of sight is actually extending as a straight line in the vertical direction.

In this example of the embodiment, the shape of the base in prism is disposed in the outer horizontal direction and the inner horizontal direction, with respect to the portion α, in the spectacle lens of this embodiment. This is because the base in prism is provided to the portion α, and the base in prism is disposed on the sides of the portion α as well. In the case of FIG. 4, the shape of the entire inner surface of the spectacle lens in the cross-sectional view in the horizontal direction is continuously twisted in the lower direction of the spectacle lens, as in FIG. 4(a)→4(b)→4(c). The processing of the spectacle lens to form this shape is relatively easy, because the base in prism is provided from edge to edge of the lens surface in the horizontal direction. As a result, if this configuration is used, the manufacturing efficiency of the spectacle lens can be improved.

The above content corresponds to Examples 1 to 3 described later.

Figure 21:
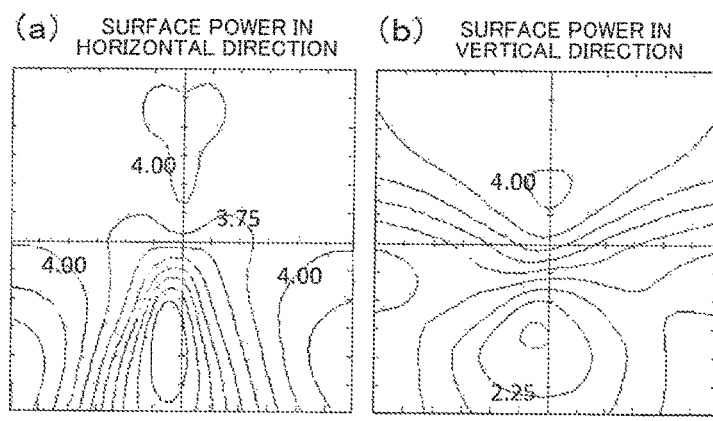
FIG. 21 is a set of diagrams depicting the distribution of a surface power according to Comparative Example 1, where (a) is a distribution map of a surface power in the horizontal direction, and (b) is a distribution map of a surface power in the vertical direction.

The above content may be interpreted from the point of view of the distribution of the surface power. This aspect will be described below. FIG. 21 shows a set of diagrams depicting the distribution of the surface power of later mentioned Comparative Example 1 (reference example, that is, the original progressive surface before providing the base in prism), where FIG. 21(a) is a distribution map of the surface power in the horizontal direction, and FIG. 21(b) is a distribution map of the surface power in the vertical direction.

Figure 22:
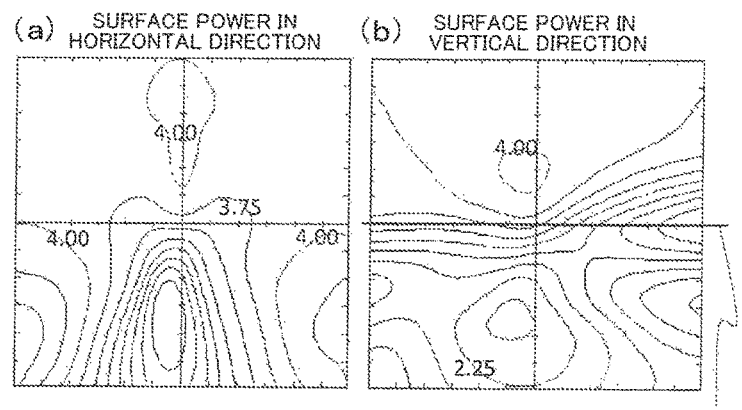
FIG. 22 is a set of diagrams depicting the distribution of a surface power according to Example 1, where (a) is a distribution map of a surface power in the horizontal direction, and (b) is a distribution map of a surface power in the vertical direction.

Similar diagrams are also provided for the later mentioned Example 1 and Example 4 in FIG. 22 and FIG. 25 respectively.

The distribution of the surface power in the horizontal direction and in the vertical direction are determined as follows.

When there is any surface, the maximum and minimum curvatures and the directions thereof at each point on the surface are unequivocally determined. Since the surface power is determined by multiplying the curvature by a coefficient of the refractive index, the maximum and minimum surface powers and the directions thereof at each point on the surface are unequivocally determined. If the maximum and minimum surface powers here are Dmax and Dmin respectively, and the direction of the maximum power is AX, then the surface power in an arbitrary direction (θ) at each point on the surface is determined by the following calculation based on Euler's Formula.

$$D = Dmax \times COS^2(\theta - AX) + Dmin \times SIN^2(\theta - AX) \quad \text{(Equation 8)}$$

The surface power in the horizontal direction can be determined by substituting θ=0 or 180 in (Equation 8), and the surface power in the vertical direction can be determined by substituting θ=90 or 270 in (Equation 8). By determining the surface powers in the horizontal direction and in the vertical direction at each point on the surface like this, the diagrams in FIG. 21(a) and FIG. 21(b) are acquired.

(Dmax+Dmin)/2 in (Equation 8) indicates the surface mean power, and |Dmax−Dmin| indicates a surface astigmatism.

In a comparison of FIG. 21(b) which depicts the distribution of surface power in the vertical direction on the original progressive surface before providing the base in prism, and FIG. 22(b) of Example 1 which corresponds to the above content, a major difference is observed in the distributions of the surface power in the vertical direction.

In this example a major difference is not observed in the distributions of the surface power in the horizontal direction, because the base in prism is simply added in the horizontal direction in this example, and the shape of the curve of the inner surface of the spectacle lens is not changed in the horizontal direction. In the vertical direction, however, the shape of the curve is changed, and as a result, the above mentioned difference is generated.

Figure 28:
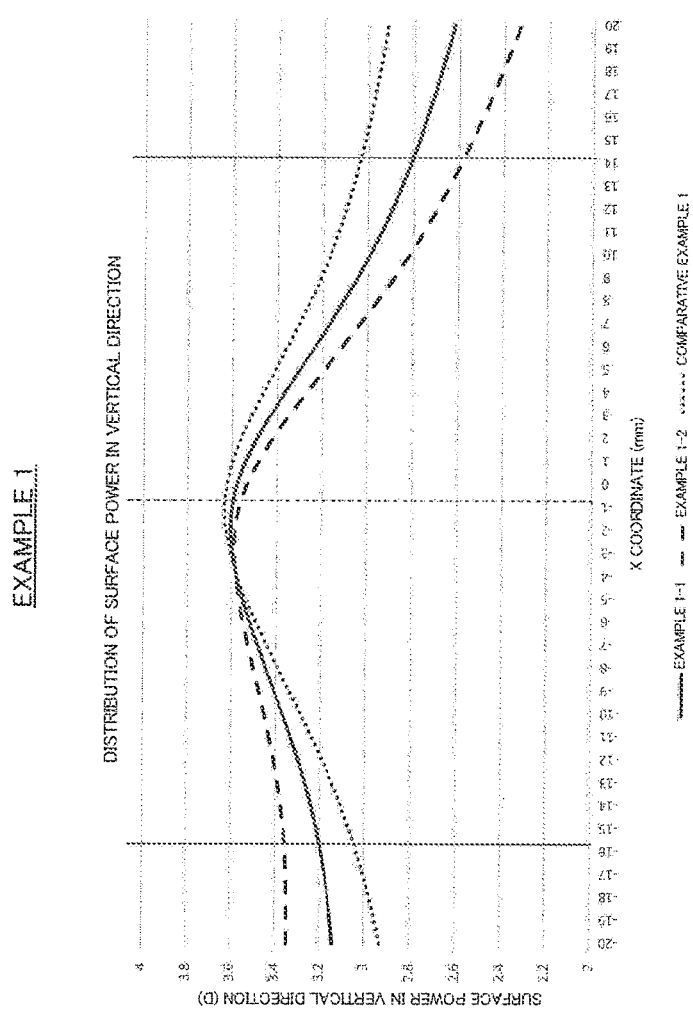
FIG. 28 is a graph on Example 1 and Comparative Example 1, plotting a surface power in the vertical direction on a line which is parallel with the horizontal reference line passing through the two engraving marks imprinted in the spectacle lens in FIG. 3, and which passes through a point 3 mm higher in the vertical direction from the mid-point of the line segment connecting the distance power measurement point and the near power measurement point.

FIG. 28 is a graph plotting a surface power in the vertical direction on a horizontal line, which is parallel with the horizontal reference line passing through the two engraving marks attached to (e.g. imprinted on) the spectacle lens in FIG. 3, and which passes through a point 3 mm higher in the vertical direction from the mid-point of the line segment connecting the distance power measurement point F and the near power measurement point N. The origin of the graph in FIG. 28 is a point at which the perpendicular line, passing through the mid-point between the two engraving marks, intersects the horizontal line. The point through which the main line of sight passes is a point shifted from the origin by 0.9 mm toward the nose in the horizontal direction.

As described later in Example 1, a major difference is observed in FIG. 28, between Comparative Example 1 and each example when the surface power at a position that is +15 mm from the point through which the main line of sight passes and the surface power at a position that is −15 mm from the point through which the main line of sight passes are compared. In other words, in the case of Comparative Example 1, essentially no difference is observed in the power at the +15 mm position and power at the −15 mm position, but in the case of each example, the power is higher on the nose side. This is the same whether the amount of the base in prism provided to the spectacle lens is 0.25Δ (Example 1-1) or is 0.50Δ (Example 1-2).

In this example, the spectacle lens for the left eye, where the nose side is on the left, as depicted in FIG. 3, is described as an example, but in the case of the spectacle lens for the right eye, the side on which the power is higher is the opposite. Therefore this example can be defined as follows, based on the obvious difference between Comparative Example 1 and each example (this embodiment).

The absolute value of the difference between the surface power values in the vertical direction in the ±15 mm positions from the point through which the main line of sight passes is 0.25 D or more (preferably 0.30 D or more, ideally 0.60 D or more) on a line which is parallel with the horizontal reference line passing through the two engraving marks, and which passes through a point that is 3 mm higher in the vertical direction from the mid-point of the line segment connecting the distance power measurement point F and the near power measurement point N.

The absolute value in Example 1-1 is 0.38 D, and the absolute value in Example 1-2 is 0.76 D.

Examples 2 and 3 corresponding to this example as well may be defined as above, with changing the position of the horizontal line to determine this absolute value. For example, the following definition may be provided.

The absolute value of the difference between the surface power values in the vertical direction in the ±15 mm positions from the point through which the main line of sight passes is 0.25 D or more (preferably 0.40 D or more, ideally 0.70 D or more) on a line which is parallel with the horizontal reference line passing through the two engraving marks, and which passes through a mid-point of the line segment connecting the distance power measurement point F and the near power measurement point N.

The absolute value of the difference between the surface power values in the vertical direction in ±15 mm positions from the point through which the main line of sight passes is 0.25 D or more (preferably 0.40 D or more, ideally 0.80 D or more) on a line which is parallel with the horizontal reference line passing through the two engraving marks, and which passes through a point that is 3 mm lower in the vertical direction from the mid-point of the line segment connecting the distance power measurement point F and the near power measurement point N.

Each of the above definitions may be used by itself, but it is preferable to appropriately combine these definitions so that the characteristics of this example are enhanced.

For another example, the amount of the base in prism on the sides of the portion α can be suppressed, as illustrated in FIG. 5. In concrete terms, the amount of the base in prism is reduced from the portion α in the outer horizontal direction and in the inner horizontal direction.

It is true that a base in prism should be provided to cancel an unintended base out prism, but the prism in the horizontal direction may be perceived as a distortion on the sides of the portion α. To prevent this, the amount of the prism (base in prism) in the horizontal direction must be minimized on the sides of the portion α. In other words, it is necessary to twist the surface shape in the horizontal direction, as in the above example, and then to untwist the sides of the portion α to return to the original state. In this example, the amount of the base in prism is controlled by changing the power of the spectacle lens (further changing the surface shape). In concrete terms, the curve itself is changed in a horizontal direction on the sides of the lens surface, as in FIG. 5(a)→5(b)→5(c). According to this configuration, a spectacle lens, in which distortion on the sides is reduced while suppressing the generation of an unintended base out prism, can be provided.

The above content corresponds to Examples 4 to 6 described later.

Similarly to the content corresponding to Example 1 described above, the above content can be interpreted from the point of view of the distribution of the surface power. This aspect will be described below. FIG. 25 shows a set of diagrams depicting the distribution of the surface power of the later mentioned Example 4, where FIG. 25(a) is a distribution map of the surface power in the horizontal direction, and FIG. 25(b) is a distribution map of the surface power in the vertical direction.

In comparing FIG. 21(a) which depicts the surface power in the horizontal direction on the original progressive surface before providing the base in prism, and FIG. 25(a) of Example 4 which corresponds to the above content, a major difference is observed in the distribution of the surface power in the horizontal direction. This is because the shape of the curve itself of the inner surface of the spectacle lens is changed in the horizontal direction.

Figure 31:
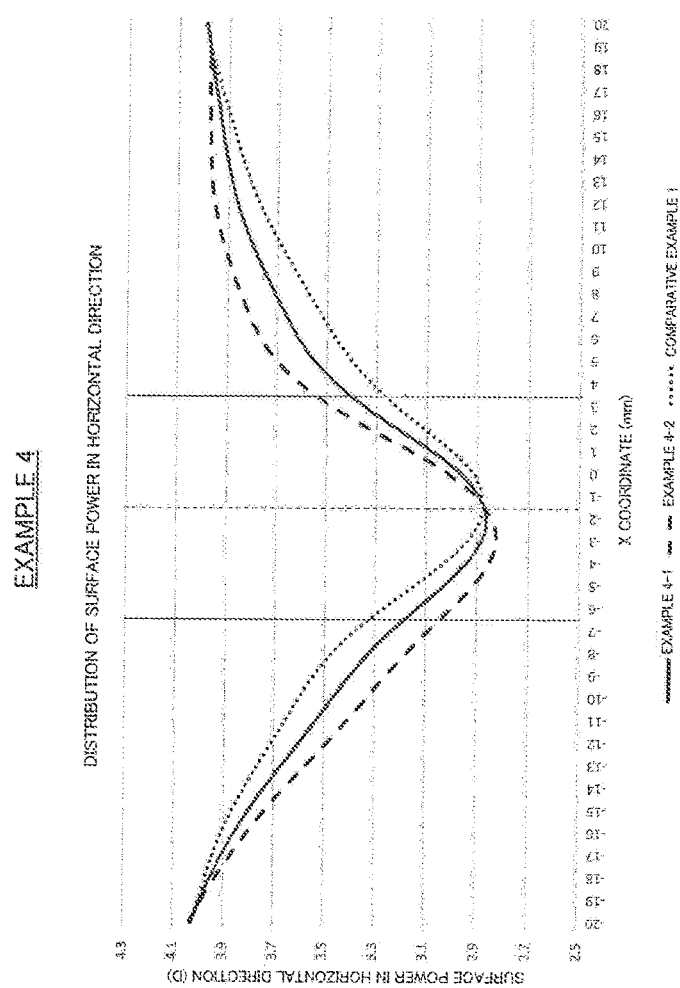
FIG. 31 is a graph on Example 4 and Comparative Example 1, plotting a surface power in the horizontal direction on a line which is parallel with the horizontal reference line passing through the two engraving marks imprinted in the spectacle lens in FIG. 3, and which passes through a point 3 mm lower in the vertical direction from the mid-point of the line segment connecting the distance power measurement point and the near power measurement point.

FIG. 31 is a graph plotting a surface power in the horizontal direction on a line which is parallel with the horizontal reference line passing through the two engraving marks imprinted on the spectacle lens in FIG. 3, and which passes through a point 3 mm lower in the vertical direction from the mid-point of the line segment connecting the distance power measurement point and the near power measurement point. FIG. 31 relates to Example 4, which corresponds to the above mentioned FIG. 28 (Example 1), where a detailed description on the drawing is omitted.

As described later in Example 4, a major difference is observed between Comparative Example 1 and each example when the surface power at a position that is +5 mm from the point through which the main line of sight passes, and the surface power at a position that is −5 mm from the point through which the main line of sight passes, are compared, as depicted in FIG. 31. In other words, in the case of Comparative Example 1, essentially no difference is observed in the power at the +5 mm position and at the −5 mm position, but in the case of each example, the power is higher on the ear side. This is the same whether the amount of the base in prism provided to the spectacle lens is 0.25Δ (Example 4-1) or is 0.50Δ (Example 4-2).

In this example, the spectacle lens for the left eye, where the nose side is on the left, as depicted in FIG. 3, is described as an example, but in the case of the spectacle lens for the right eye, the side on which power is higher is the opposite. Therefore this example can be defined as follows, based on the clear difference between Comparative Example 1 and each example (this embodiment).

The absolute value of the difference between the surface power values in the horizontal direction in ±5 mm positions from the point through which the main line of sight passes is 0.12 D or more (preferably 0.20 D or more, ideally 0.40 D or more) on the line which is parallel with the horizontal reference line passing through the two engraving marks, and which passes through a point that is 3 mm lower in the vertical direction from the mid-point of the line segment connecting the distance power measurement point F and the near power measurement point N.

The absolute value in Example 4-1 is 0.22 D, and the absolute value in Example 4-2 is 0.50 D.

Examples 5 and 6 corresponding to this example as well may be defined as above, with changing the position of the horizontal line to determine this absolute value. For example, the following definition may be provided.

The absolute value of the difference between the surface power values in the horizontal direction in ±15 mm positions from the point through which the main line of sight passes is 0.12 D or more (preferably 0.20 D or more, ideally 0.40 D or more) on a line which is parallel with the horizontal reference line passing through the two engraving marks, and which passes through a mid-point of the line segment connecting the distance power measurement point F and the near power measurement point N.

The absolute value of the difference between the surface power values in the horizontal direction in ±15 mm positions from the point through which the main line of sight passes is 0.12 D or more (preferably 0.20 D or more, ideally 0.40 D or more) on a line which is parallel with the horizontal reference line passing through the two engraving marks, and which passes through a point that is 3 mm higher in the vertical direction from the mid-point of the line segment connecting the distance power measurement point F and the near power measurement point N.

Each of the above definitions may be used by itself, but it is preferable to appropriately combine these definitions so that the characteristics of this example are enhanced.

The amount of adding the base in prism in this case can be arbitrary, as long as the above mentioned functions are exhibited. At the moment, however, according to the research of the present inventors, the above effect can be acquired with certainty and the influence of aberration and distortion generated by twisting the surface can be minimized if the amount of adding the base in prism is 2Δ or less, in the case of adding the base in prism to the progressive power lens from an upper part (e.g. distance portion) to a lower part (e.g. near portion) of the lens, even if the individual differences of a user are considered.

(1.2 Difference from Prior Art)

As disclosed in PTL 1, there are examples of providing a prism in a spectacle lens in prior art. However, the prisms known in prior art are all prisms provided as prescriptions to correct the visual symptoms of the user, such as heterotropia, heterophoria, and fixation disparity (prescription prism). In the case of the prism according to PTL 1, the prescription prism in the distance portion and the prescription prism in the near portion are acquired in advance, and the amount of the prism is changed continuously between the distance portion and the near portion.

Even if there is an example of disposing a prism in the horizontal direction in the spectacle lens, it is still a prescription lens, and the entire amount of the prism is used for correcting the visual symptoms of the user. Therefore in this case, there remains no amount of prism for cancelling the unintended base out prism, as described in this embodiment, in other words, a spectacle lens having a prism for cancelling the unintended base out prism does not exist in prior art. And again the base in prism according to this embodiment is different from a prescription prism, which is provided as a prescription to correct the visual symptoms of the user, such as heterotropia, heterophoria and fixation disparity. Hence, if a value of the prescription prism is written on the lens bag of the spectacle lens, that value may be different from the amount of the prism that is measured in the actual spectacle lens. In this case, if this amount of prism is related to a base in prism, then it can be regarded that the technical idea of this embodiment is reflected.

<2. Design Method (Manufacturing Method) of Spectacle Lens>

A design method (manufacturing method) of the spectacle lens according to this embodiment will be described. In the following description, the content already described in <1. Spectacle lens> will be omitted. For the content not described in the following, a publically known technology may be used. For example, the content of the supply system of the spectacle lens disclosed in WO 2007/077848 may be used.

(2-1. Preparation Step)

In this step, preparation is performed for the subsequent design step. A first preparation is acquiring information required for designing the spectacle lens. The information related to the spectacle lens is roughly divided into: item-specific information which is data unique to a lens item; and user-specific information which is data unique to a user. The item-specific information includes information on a refractive index n of the lens material, and progressive surface designing parameters represented by the corridor length. The user-specific information includes the distance power (e.g. spherical power S, cylinder power C, astigmatic axis AX, prism power P, prism base direction PAX), addition power ADD, layout data (e.g. distance PD, near PD, eye point position), frame shape, and parameters on the positional relationship between the frame and eyes (forward tilting angle, camber angle, distance between vertexes).

(2-2. Design Step)

In this step, the spectacle lens is designed based on the information on the spectacle lens. In this designing, a shape of a base in prism for cancelling at least a part of the unintended base out prism, which is generated in the above mentioned portion α (a portion of the spectacle lens in which power continuously changes and through which the main line of sight, influenced by the convergence of the user, passes), is provided to this portion.

For the design method, a publically known design method, to provide a prism to a spectacle lens, may be used.

For example, based on the information on the spectacle lens, prior design information on the optical layout of the original progressive surface, before considering the unintended base out prism, is created in advance (later mentioned Comparative Example 1). Then the portion α, the side portions thereof, and other portions are designed by applying to the prior design information the method corresponding to the later mentioned Examples 1 to 3 (twisting surface shape), and the method corresponding to the later mentioned Examples 4 to 6 (twisting the surface shape and then untwisting the side portion back to the original state).

This prior design information on the optical layout of the original progressive surface may be acquired in advance in the preparation step.

The design to implement the configuration mentioned in <1. Spectacle lens> may be performed on the spectacle lens. For the actual design method in this case, a publically known method may be used based on the information on the spectacle lens.

Figure 6:
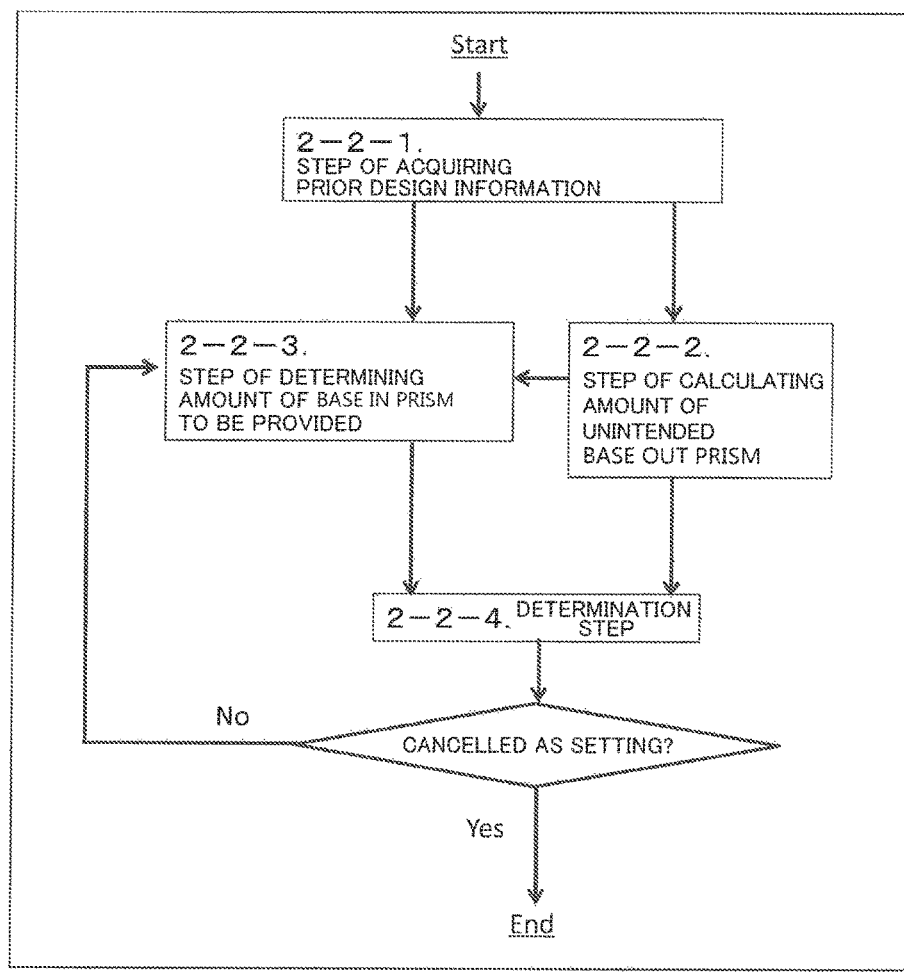
FIG. 6 is a flow chart depicting a design step of a method for manufacturing the spectacle lens according to this embodiment.

The above design step can be described for each step as follows, for example. FIG. 6 is a flow chart depicting the design step according to this embodiment.

(2-2-1. Step of Acquiring Prior Design Information)

In this step, prior design information on the optical layout of the original progressive surface is acquired in advance.

(2-2-2. Step of Calculating Unintended Base Out Prism)

This is a step that is preferable to perform, in which the amount of the unintended base out prism, to be generated at each point on the inner surface of the spectacle lens, can be estimated based on the prior design information using the above mentioned Prentice's Formula (Equation 2). In this step, the amount of the unintended base out prism may be calculated by the computing means in the designing unit, or may be computed by an external server or cloud, for example.

(2-2-3. Step of Determining Amount of Base in Prism to be Provided)

This is a step that is preferable to be performed for calculating the amount of the base in prism, to be provided corresponding to the amount of the unintended base out prism, which was estimated in the previous step. A percentage of the unintended base out prism to be cancelled may be set in advance, and the amount of the base in prism may be determined based on this setting, or the amount of the base in prism may be determined in advance.

If the (2-2-2. Step of calculating the amount of unintended base out prism) has not been performed, a design to provide a predetermined amount of base in prism to the spectacle lens is performed. In this case, the (2-2-2. Step of calculating amount of unintended base out prism) is performed here. Then the predetermined amount of the base in prism and the calculated amount of the unintended base out prism are compared, and it is determined whether the unintended base out prism can be sufficiently cancelled at least in the portion α (2-2-4. Determination step).

If the resulting degree of cancellation is sufficient, the design step ends, and the manufacturing step is performed. If the degree of cancellation is insufficient, on the other hand, a predetermined amount of base in prism is added, then the amount of base in prism after this addition and the amount of unintended base out prism are compared, and the above determination is performed again. This determination step is repeated until the degree of cancellation becomes sufficient.

(2-3. Manufacturing Step)

In this step, the spectacle lens is manufactured based on the result of the design step. For a specific manufacturing method, a publically known method may be adopted. For example, the design data acquired in the design step is input to a processor, whereby a lens blank is processed into a spectacle lens.

Processing steps other than these steps (e.g. cleaning step, coating) may be added as necessary.

<3. Supply System of Spectacle Lens>

Figure 7:
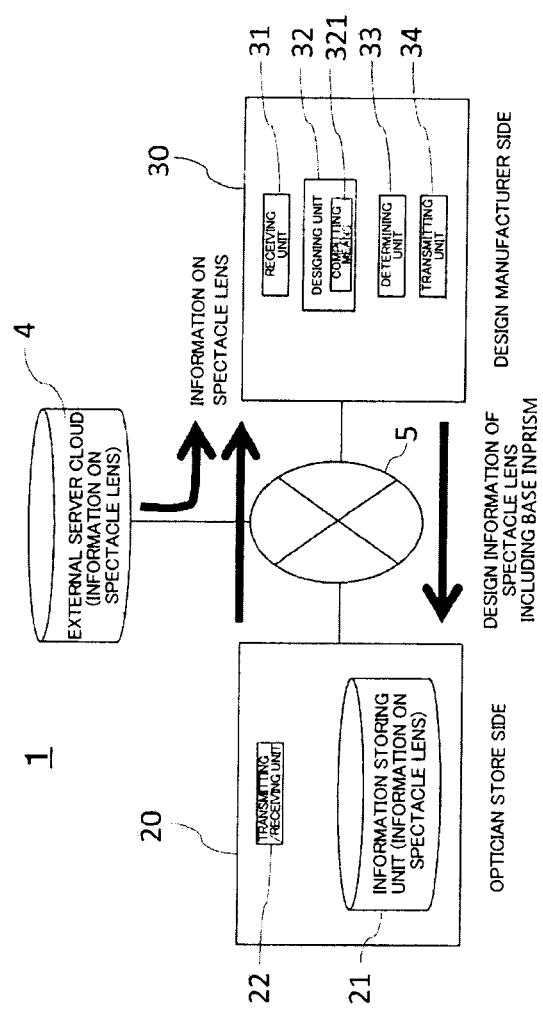
FIG. 7 is a block diagram depicting a spectacle lens supply system according to this embodiment.

The spectacle lens supply system according to this embodiment will now be described. The spectacle lens supply system of this embodiment has a control unit for controlling each component, which will be described below. In this embodiment, a case when each component, including the control unit, is disposed in a computer installed at a spectacle lens design manufacturer side (design manufacturer side terminal 30), will be described. FIG. 7 is a schematic block diagram depicting the spectacle lens supply system 1 according to this embodiment.

(3-1. Receiving Unit 31)

The receiving unit 31 receives information on the spectacle lens from an information storing unit 21 in an optician side terminal 20 via a transmitting/receiving unit 22 using a public line 5. This information is as described above. This information may include the prior design information on the optical layout of the original progressive surface described above as well. This information is normally input by an inputting means of a computer installed in an optical store side (optical store side terminal 20). This information may be acquired from a source other than the optical store side terminal 20 (e.g. external server, cloud 4).

(3-2. Designing Unit 32)

The designing unit 32 provides a shape of the base in prism, for cancelling at least a part of the unintended base out prism which may be generated in a portion of the spectacle lens in which power continuously changes and through which a line of sight, influenced by the convergence of the user, passes, based on the information on the spectacle lens. In order to design the optical layout of the spectacle lens, it is preferable that the designing unit 32 includes a computing means 321 to calculate the optical parameters. However, if the optical layout before adding the base in prism is included in the information acquired from a source other than the optical store side terminal 20, the designing unit 32 may simply add the base in prism to this optical layout.

A concrete design method is as described in <2. Design method (manufacturing method) of spectacle lens>.

(3-3. Transmitting Unit 34)

The transmitting unit 34 transmits the design information acquired from the designing unit 32. The transmission destination is the optical store side terminal 20. The design information (to be more specific, the design information visualized by the surface astigmatism distribution map or the mean power distribution map) is transmitted to the optical store side, and the optical store side confirms this design information, transmits this design information, if there is no problem, to a manufacturer who manufactures the spectacle lens, and requests the manufacturing of this spectacle lens. If the design manufacturer can also manufacture the spectacle lens, the optical store side terminal 20 transmits information to request the manufacturing of the spectacle lens to the design manufacturer side terminal 30.

If the transmitting unit 34 and a processor of the spectacle lens (not illustrated) exist in a same apparatus, the spectacle lens supply system 1 may be called a "spectacle lens manufacturing apparatus".

A configuration, other than for the above mentioned components, may be added as necessary. For example, as described in <2. Design method (manufacturing method) of spectacle lens>, a computing unit (not illustrated), to estimate an amount of unintended base out prism, may be disposed independently, or the computing means 321 in the designing unit 32 may be used for this estimation. An amount of base in prism for cancelling the estimated amount of base out prism at a predetermined ratio may be estimated by this computing unit (not illustrated) or by the computing means 321. The amount of base in prism acquired as the result may be transmitted to the designing unit 32, and the design information reflecting the amount of this base in prism may be acquired from the designing unit 32. A determining unit 33, to perform the above determination step, may be disposed. This determining unit 33 may be configured as a part of the designing unit 32.

<4. Supply Program of Spectacle Lens>

The technical idea of this embodiment is also reflected in a program to operate the above mentioned spectacle lens supply system 1, and a storage medium thereof. In other words, by using a program which causes a computer (terminal) to function at least as the receiving unit 31, the designing unit 32 and the transmitting unit 34, the spectacle lens which can suppress unnecessary convergence can be supplied.

<5. Effect of Embodiment>

According to this embodiment, even if an unintended base out prism is generated by deflection of the main line of sight toward the nose, the negative influence of the base out prism can be reduced because the spectacle lens has been originally formed to a shape to generate a base in prism. In other words, by forming the spectacle lens to a shape to generate a base in prism in advance, an unintended base out prism that may be generated by convergence can be cancelled. As a result, unnecessary convergence can be suppressed.

By suppressing unnecessary convergence, a user who has worn a simple single vision lens, which has no corridor, feels no discomfort even if users change their spectacle lens to a progressive power lens, for example.

The processing of the spectacle lens in particular is relatively easy, since the shape of the base in prism is provided to portions in the outer horizontal direction and in the inner horizontal direction with respect to the portions through which the main line of sight passes in the spectacle lens. As a result, if this configuration is used, the manufacturing efficiency of the spectacle lens can be improved.

This effect becomes particularly conspicuous if the configuration to continuously twist the entire inner surface shape of the spectacle lens in the horizontal sectional view, in the lower direction of the spectacle lens, as in FIG. 4(*a*) →4(*b*)→4(*c*) (the shape of the base in prism is provided evenly from the edge to the edge of the spectacle lens in the horizontal direction).

On the other hand, a spectacle lens, where the generation of the unintended base out prism is suppressed and distortion is reduced on the sides of the lens surface, can be provided by decreasing the base in prism in the outer horizontal direction and the inner horizontal direction from the portion through which the main line of sight passes.

This effect is exhibited if the curve itself is deformed in the horizontal direction on the sides of the lens surface, as in FIG. 5(*a*)→5(*b*)→5(*c*). According to this configuration, a spectacle lens, where the generation of the unintended base out prism is suppressed and distortion is reduced on the sides of the lens surface, can be provided.

When reducing the amount of the base in prism from the portion of the spectacle lens through which the main line of sight passes in the outer horizontal direction and the inner horizontal direction, it is preferable to reduce the amount of base in prism quickly without creating a region where the amount of base in prism does not change. This is because if a region, where the amount of base in prism does not change in the inner horizontal direction and the outer horizontal direction from the point on the main line of sight (the amount of base in prism is constant), exists, the degree of twisting the surface increases when moving away from the main line of sight in the horizontal direction, and as a result, a major surface astigmatism is generated on the surface. This surface astigmatism is perceived by the user as a blur, which is not desirable in terms of clear vision.

The above effects can be implemented even when the above configuration is defined by the surface power (the absolute value of the difference between surface power values in the vertical directions is a predetermined value or more at a predetermined horizontal position from the point through which the main line of sight passes).

In the above two types of configuration (FIG. 4, FIG. 5), the effect of each type of configuration is synergistically added to the main effect of the invention, that is, "to cancel the unintended base out prism that may be generated by convergence". Therefore a spectacle lens, which can be very comfortably worn, can be provided.

<6. Modification>

The technical scope of the present invention is not limited to the above mentioned embodiments, but includes various changes and modifications within a scope of deriving specific effects acquired by the constituent elements of the invention and combinations thereof.

(Spectacle Lens)

In the above examples, a progressive multifocal lens, which includes a distance portion and a near portion, was described as an example. However, the progressive power lens may be a progressive multifocal lens which includes not the distance portion, but an intermediate portion (e.g. portion to view an object at a 400 cm to 100 cm distance), and a near portion (a so called "occupational lens"), or may be a progressive multifocal lens which includes a near portion and another near portion to view an object even closer (e.g. less than a 100 cm distance) (so called "near vision lens").

In the case of the occupational lens or the near vision lens, the user is constantly in a convergence state, therefore the effect of the present invention is especially noteworthy.

In the case of an occupational lens or a near vision lens, the distance portion in (Equation 6) and (Equation 7) is regarded as a portion to view a specific distance (e.g. distance power measurement point F→specific distance power measurement point), and the near portion is regarded as a portion to view a distance closer than the specific distance.

Even in the case of a single vision lens having plus power, where power changes while moving away from a region to see an object at a predetermined distance, a corridor where plus power is added in the lower direction of the spectacle lens still exists, since only in this case the above mentioned distance portion (region which is for seeing a distance and in which power is approximately constant) does not exist. Even if the distance power measurement point does not exist, a power measurement point, to check whether a predetermined power is acquired in a predetermined position on the spectacle lens, may be regarded as the above mentioned "power measurement point in the portion to view a specific distance".

Further, in the case of the above mentioned single vision lens, the distance portion does not exist, hence the distance power measurement point does not exist, and the "main line of sight", defined above in the inner surface progressive power lens, does not exist either. However, convergence is still generated even if the single vision lens is used, and therefore the problem of the unintended base out prism still occurs. As a consequence, the base in prism can be provided to such a single vision lens via a method similar to the method described above. Practically speaking, the method for specifying the main line of sight is setting "the power measurement point in a portion to view a specific distance" as a temporary distance power measurement point, and specifying the line segment connecting this point and the near power measurement point N as the main line of sight.

(Twisting Shape)

In the above example, which described a case of the inner surface progressive power lens, twisting the shape of the inner surface was described as an example. On the other hand, the prismatic effect can be exhibited only if there is a difference between the gradient of the tangential line on the outer surface and the gradient of the tangential line on the inner surface at a portion through which the main line of sight passes in the cross-sectional view of the spectacle lens in the horizontal direction. Therefore the shape of the outer surface may be continuously twisted in the lower direction of the spectacle lens, or both the inner and outer surfaces may be continuously twisted.

The above example described a case when the surface shape is continuously twisted in the lower direction from the distance power measurement point F or the prism power measurement point P, so as to continuously increase the base in prism, but the base in prism may be generated not by continuously twisting the surface shape but by evenly inclining the entire shape of the inner surface. However, the above mentioned twisting method is preferable since the line of sight is gradually deflecting toward the nose in the convergence, and the prism on the side of the lens surface in the horizontal direction tends to be perceived as distorted.

The above mentioned twisting may be applied to a part of the portion α. Critical here is to cancel at least a part of the unintended base out prism. However applying the above mentioned twisting to all of the portion α is preferable to balance the shape of the spectacle lens.

If the portion where the power changes is only a part of the spectacle lens, and power continuously changes only in this part, then the above mentioned shape can be used only to this part. The unintended base out prism exerts a major influence on the vision of the user only in a portion where plus power is generated in the spectacle lens. Therefore it is sufficient if at least a part of the base out prism can be cancelled in this portion α.

EXAMPLES

The present invention will be described in concrete terms using the following examples. Needless to say, the present invention is not limited to these examples.

In this section, an inner surface progressive power lens (outer surface is a spherical surface), which includes a distance portion, a near portion, and a corridor existing there between on the inner surface is used as a spectacle lens. Therefore the following results to be described are results on the inner surface.

As mention above in brief, Comparative Example 1 will be described first as a reference example. Comparative example 1 is an example of a spectacle lens before taking countermeasures to handle the unintended base out prism.

Each of Examples 1 to 3, on the other hand, is an example of a spectacle lens of which inner shape in the horizontal cross-sectional view is continuously twisted in the lower direction, so that a base in prism is provided to a part lower than the distance power measurement point F, or the prism power measurement point P of Comparative Example 1.

Each of Examples 4 to 6 is an example of a spectacle lens when the shape (shape of the curve itself) of the spectacle lens of Example 1, is deformed in the horizontal direction on the sides of the portion α.

Each example will now be described.

Comparative Example 1 (Reference Example)

In this example, an outer surface of the spectacle lens is a spherical surface, and an inner surface of the spectacle lens is a progressive surface, and the spherical power (S) is 0.00 D, the cylinder power (C) is 0.00 D, and the addition power (ADD) is 2.00 D. The other parameters are: the base curve is 4.00 D, the refractive index is 1.60, the prism prescription is 0, and the center thickness is 2.00 mm, and when the mid-point of a line segment connecting the two engraving marks is an origin, the coordinates of the distance power measurement point F are (0.0, 8.0), the coordinates of the near power measurement point N are (−2.5, −14.0), the coordinates of the prism power measurement point are (0.0, 0.0), and the coordinates of the fitting point are (0.0, 4.0). In this example, it is assumed that the line connecting the distance power measurement point F and the near power measurement point N is the portion corresponding to the main line of sight.

Figure 8:
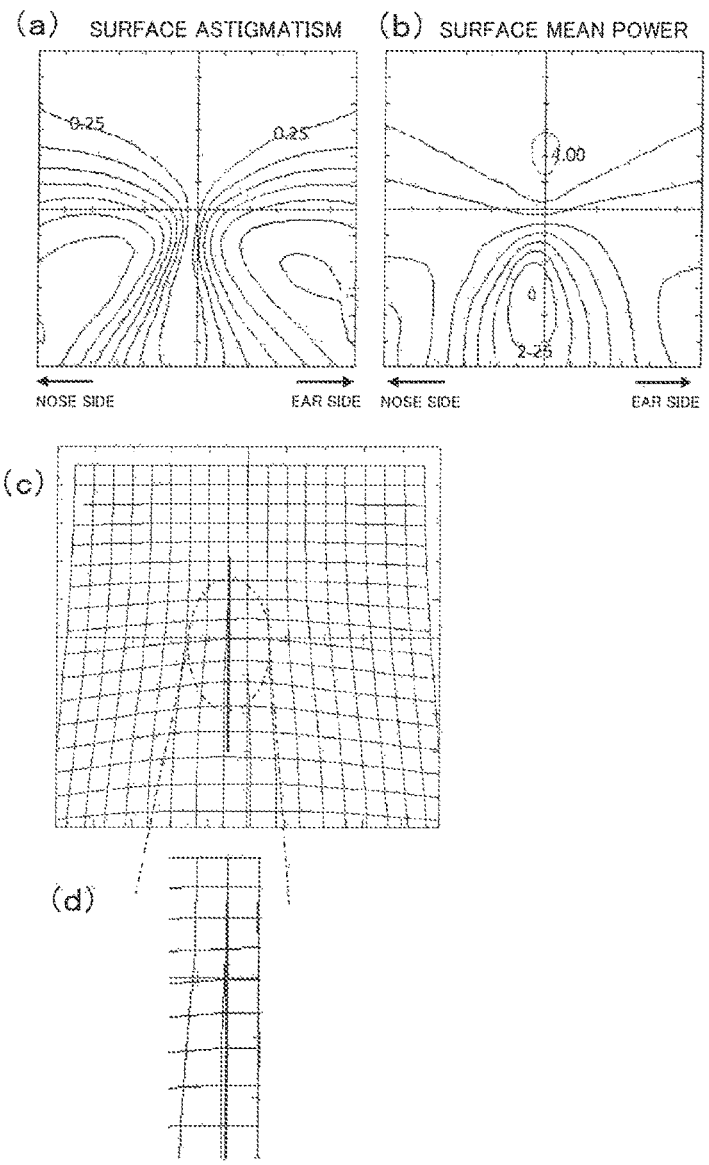
FIG. 8 is a set of diagrams on a spectacle lens according to Comparative Example 1 (reference example), where (a) is a distribution map of a surface astigmatism, (b) is a distribution maps of a surface mean power, (c) is a diagram depicting an amount of deflection of a ray following the line of sight when an object is seen through the shape of the inner surface, that is, an amount of the prismatic effect, and (d) is an enlarged view of a part of (c).

FIG. 8 shows a set of diagrams depicting the prior design information on the optical layout of the original progressive surface acquired as the result. FIG. 8(a) is a distribution map of a surface astigmatism, FIG. 8(b) is a distribution map of a surface mean power, FIG. 8(c) is a diagram depicting an amount of deflection of a ray following the line of sight when an object is seen through the shape of the inner surface, that is, an amount of the prismatic effect, and FIG. 8(d) is an enlarged view of a part of FIG. 8(c). Here FIG. 8(c) indicates the correlation between the position of the spectacle lens (inner surface here) in a plan view, and a position through which the line of sight actually passes. In FIG. 8(c), the grid interval is 2.5 mm. (This is the same in the following description as well.)

For example, in FIG. 8(c), the vertical line (bold line), which is shifted from the origin toward the nose by 2.5 mm, is added. In the case of the single vision lens of which power does not change, an unintended base out prism is not generated, therefore the portion corresponding to the bold line on the spectacle lens and the grid line corresponding to this bold line match (in other words, the line of sight does not shift in the horizontal direction). Therefore in FIG. 8(c), the grid line and the bold line match, extending in the vertical direction in the upper part of the spectacle lens, even though this is a comparative example.

Figure 2:
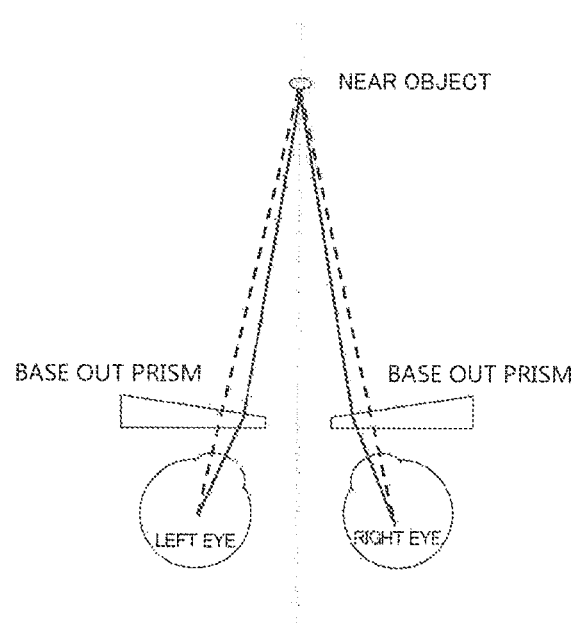
FIG. 2 is a schematic top view depicting an influence which the user receives from the base out prisms.

However, in Comparative Example 1, the grid line gradually shifts from the bold line toward the nose in the lower part of the spectacle lens, as illustrated in FIG. 8(d). This means that an unintended base out prism is generated when the user sees the lower part of the spectacle lens, that is, an excessive convergence toward the nose is generated. As illustrated in FIG. 2, if an unintended base out prism is generated, both eyeballs must be excessively turned inward to visually perceive the object. FIG. 8(c) and FIG. 8(d) illustrate this result.

The meaning of the grid lines is the same for the following description as well.

In this and subsequent examples, the cylinder power is set to 0.00 D. However, it is also possible that the cylinder power is provided in the spectacle lens because of an astigmatic prescription. Even in this case, the cylinder power corresponding to the astigmatic prescription can be subtracted (vector subtraction), or in the case of the progressive multifocal lens, the surface astigmatism at the distance measurement reference point can be subtracted (vector subtraction). Then the distribution map of the surface mean power corresponding to FIG. 8(b) is acquired.

Example 1

According to this example, in the inner surface of the spectacle lens of Comparative Example 1, the tangential line on a point of the main line of sight is set to descend toward the nose in the horizontal sectional view, and is set to ascend toward the ear in the horizontal sectional view. Further, the base in prism is continuously provided by continuously twisting the inner surface from the prism power measurement point P to the near power measurement point N. The amount of base in prism at the prism power measurement point P is 0, and the amount of base in prism at the near power measurement point N is 0.25Δ (Example 1-1) and 0.50Δ (Example 1-2). In subsequent examples as well, each case when the amount of base in prism is 0.25Δ and 0.50Δ are tested.

Figure 9:
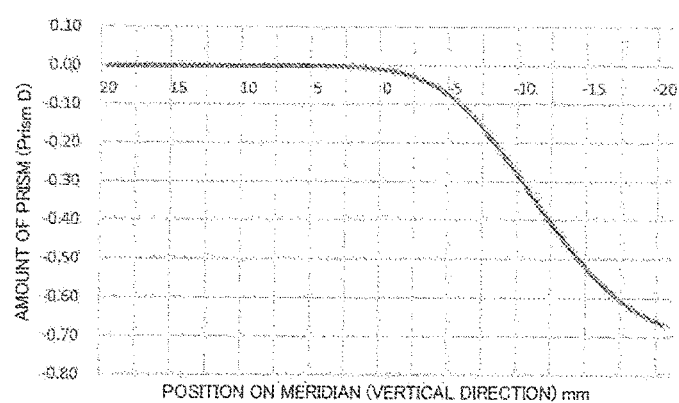
FIG. 9 is a graph depicting an amount of the prism added to the lens as a result of continuously twisting the inner surface of the lens in Example 1, where the abscissa indicates the perpendicular position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

FIG. 9 (Example 1-2) depicts the result when the inner surface is continuously twisted like this. The abscissa in FIG. 9 indicates the perpendicular position of a contact between the main line of sight and the inner surface when the origin is an intersection point of a line segment passing through two engraving marks and the main line of sight (e.g. center of the two engraving marks), where the positive direction is the upper direction of the spectacle lens, and the negative direction is the lower direction of the spectacle lens, and the ordinate indicates the amount of base in prism (minus sign) that is added as a result of continuously twisting the inner surface.

As depicted in FIG. 9, the spectacle lens is designed such that the absolute value of the base in prism continuously increases by continuously twisting the shape of the inner surface in the lower direction from the point corresponding to the prism power measurement point P (a point where a line, which is parallel with the horizontal reference line passing through the two engraving marks, and which passes through the prism power measurement point P, intersects with the main line of sight).

Figure 15:
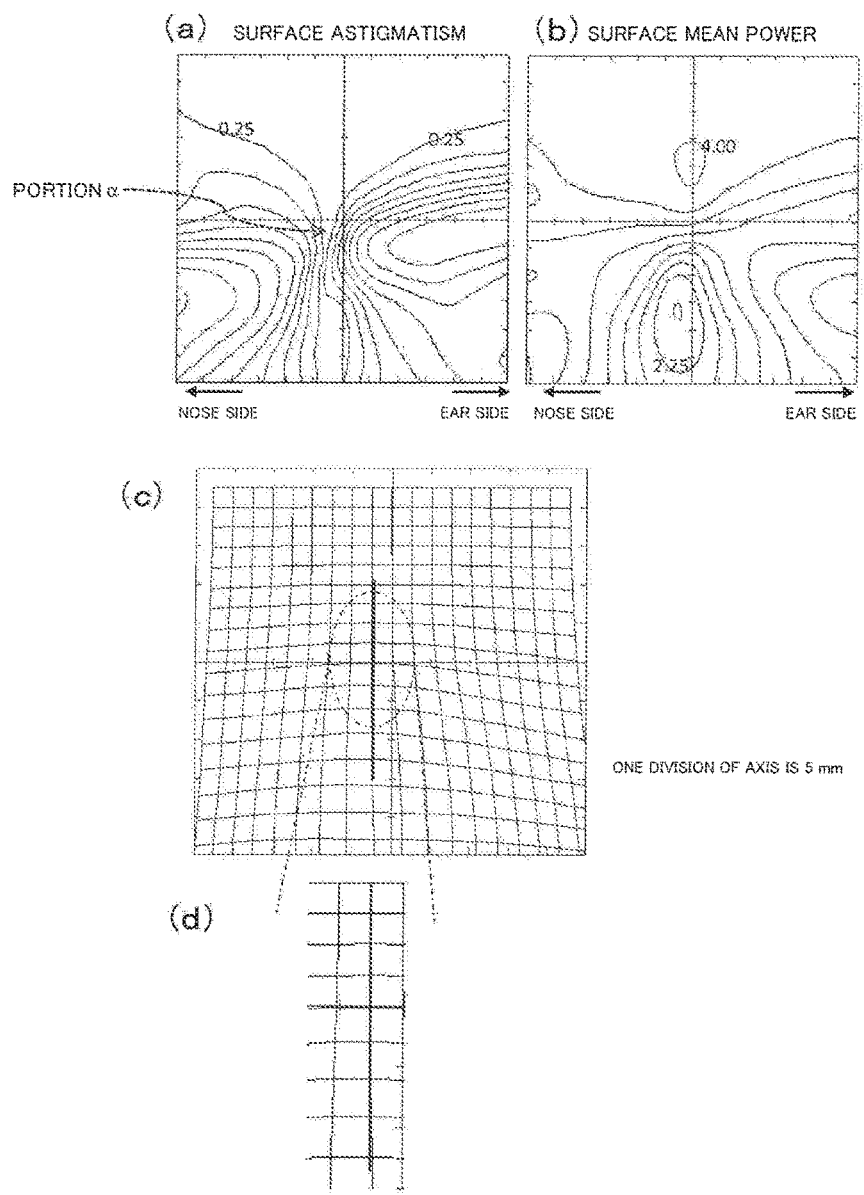
FIG. 15 is a set of diagrams of the spectacle lens according to Example 1, where (a) is a distribution map of a surface astigmatism, (b) is a distribution map of a surface mean power, (c) is a diagram depicting an amount of deflection of a ray following the line of sight when an object is seen through the shape of the inner surface, that is, an amount of prismatic effect, and (d) is an enlarged view of a part of (c).

FIG. 15 (Example 1-2) depicts the design information acquired in this example. FIG. 15(a) is a distribution map of a surface astigmatism, FIG. 15(b) is a distribution map of a surface mean power, FIG. 15(c) is a diagram depicting an amount of deflection of a ray following the line of sight when an object is seen through the shape of the inner surface, that is, an amount of prismatic effect, and FIG. 15(d) is an enlarged view of a part of FIG. 15(c).

For example, in FIG. 15(c), the vertical line (bold line), which is shifted from the origin toward the nose by 2.5 mm, is added. In this example, even if an unintended base out prism is generated in a lower part of the spectacle lens, the base in prism provided to the inner surface of the spectacle lens makes it possible to match the portion corresponding to the bold line on the spectacle lens with the grid line corresponding to this bold line (in other words, the line of sight does not shift in the horizontal direction). Therefore in FIG. 15(c) and FIG. 15(d), the grid line and the bold line match, extending in the vertical direction in the upper part of the spectacle lens. In other words, an unnecessary convergence can be suppressed in this example.

As depicted in FIG. 22(b), which is a distribution map of the surface power in the vertical direction, and FIG. 28, in which the surface power in the vertical direction is plotted, the absolute value of the difference between the surface power values in ±15 mm positions from the point through which the main line of sight passes, on a line which is parallel with the horizontal reference line passing through the two engraving marks and which passes through a point that is 3 mm higher in the vertical direction from the mid-point of the line segment connecting the distance power measurement point F and the near power measurement point N, is 0.38 D in the case of Example 1-1, and 0.76 D in the case of Example 1-2, both at or over 0.25 D—a specified value. In this example, the main line of sight is defined as a line segment connecting the distance power measurement point F and the near power measurement point N, but the position through which the main line of sight passes is −0.9 mm in the X coordinate in FIG. 28.

In this and subsequent examples, the value of the "position through which the main line of sight passes" corresponds to a horizontal distance (above mentioned amount of inset h) from the vertical line (perpendicular line) connecting the upper vertex and the lower vertex of the spectacle lens. In the above described example, the case of the horizontal distance from the vertex in the horizontal sectional shape of the spectacle lens was described, but the present invention can be applied to other cases.

Example 2

Figure 10:
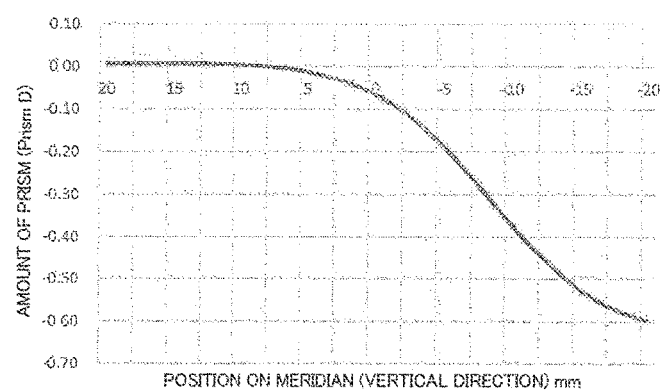
FIG. 10 is a graph depicting an amount of the prism added to the lens as a result of continuously twisting the inner surface of the lens in Example 2, where the abscissa indicates the perpendicular position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 1, but an aspect of continuously adding the base in prism is changed, as depicted in FIG. 10. In concrete terms, the base in prism is continuously added, starting from the mid-position between the distance power measurement point and the prism power measurement point.

Figure 16:
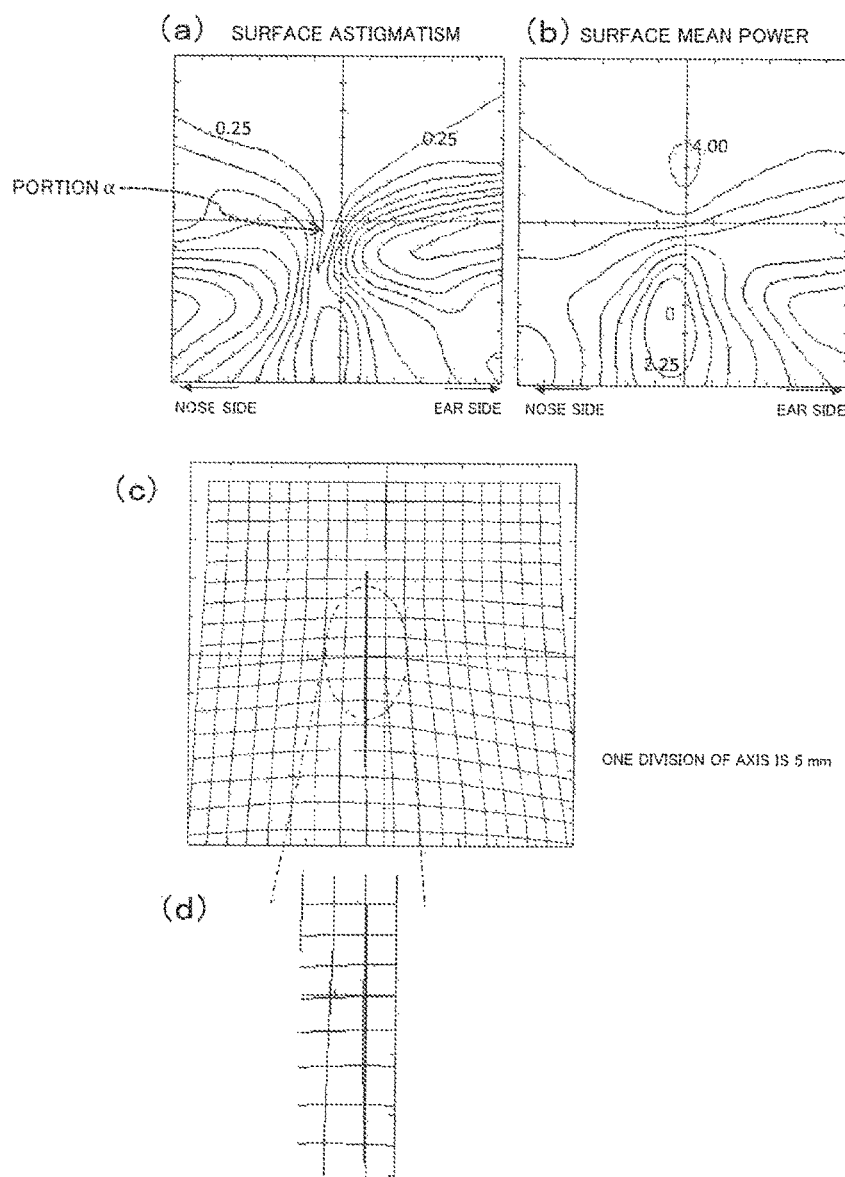
FIG. 16 is a set of diagrams of the spectacle lens according to Example 2, where (a) is a distribution map of a surface astigmatism, (b) is a distribution map of a surface mean power, (c) is a diagram depicting an amount of deflection of a ray following the line of sight when an object is seen through the shape of the inner surface, that is, an amount of prismatic effect, and (d) is an enlarged view of a part of (c).

FIG. 16 is a design information acquired in this example. In FIG. 16(c) and FIG. 16(d), the grid line and the bold line match, extending in the vertical direction in the upper part of the spectacle lens. In other words, an unnecessary convergence can be suppressed in this example as well.

Figure 23:
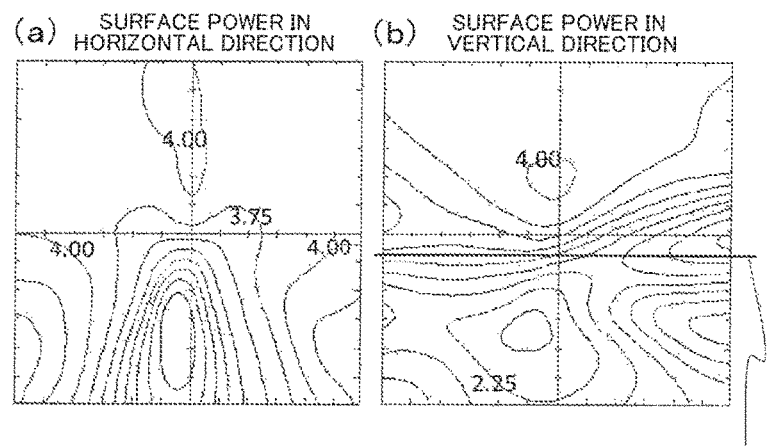
FIG. 23 is a set of diagrams depicting the distribution of a surface power according to Example 2, where (a) is a distribution map of a surface power in the horizontal direction, and (b) is a distribution map of a surface power in the vertical direction.
Figure 29:
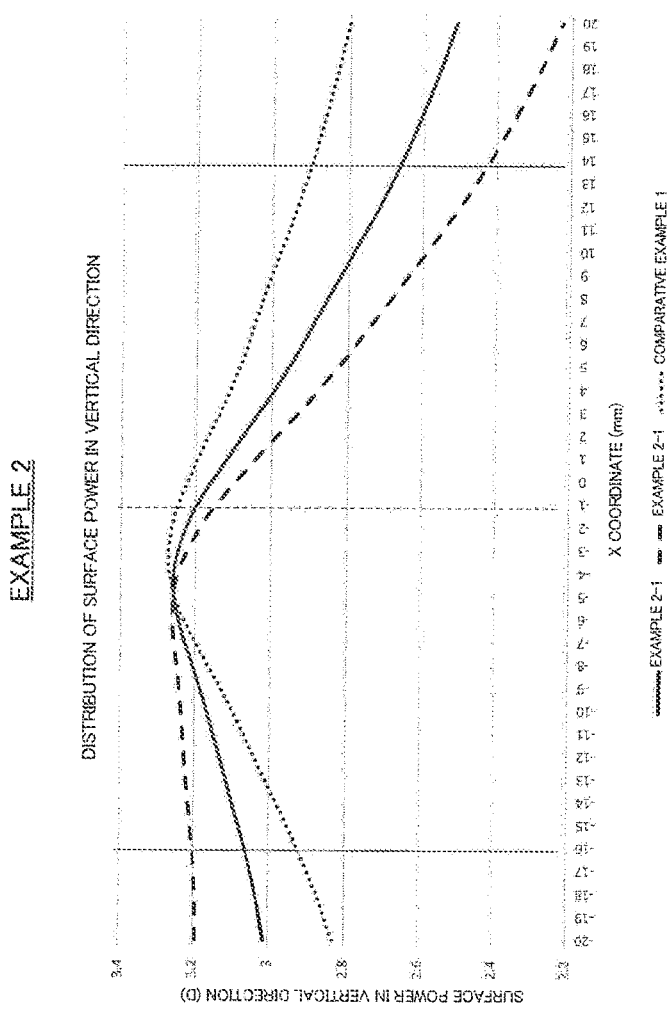
FIG. 29 is a graph on Example 2 and Comparative Example 1, plotting a surface power in the vertical direction on a line which is parallel with the horizontal reference line passing through the two engraving marks imprinted in the spectacle lens in FIG. 3, and which passes through a mid-point of the line segment connecting the distance power measurement point and the near power measurement point.

As depicted in FIG. 23(b) which is a distribution map of the surface power in the vertical direction, and FIG. 29 in which the surface power in the vertical direction is plotted, the absolute value of the difference between the surface power values in ±15 mm portions from the point through which the main line of sight passes, on a line which is parallel with the horizontal reference line passing through the two engraving marks and which passes through the mid-point of the line segment connecting the distance power measurement point and the near power measurement point, is 0.41 D in the case of Example 2-1, and 0.78 D in the case of Example 2-2, both exceeding the specified 0.25 D value. In this example, the position through which the main line of sight passes is −1.25 mm in the X coordinate in FIG. 29.

Example 3

Figure 11:
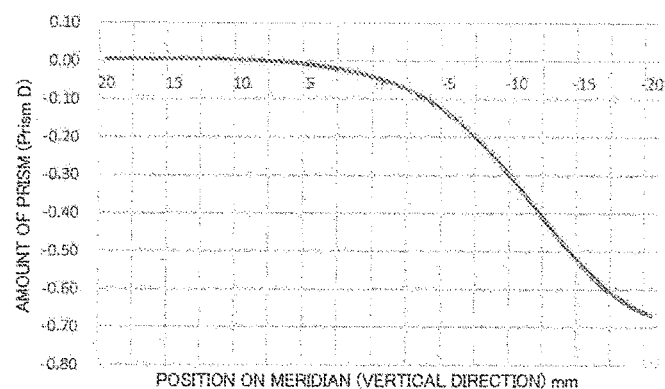
FIG. 11 is a graph depicting an amount of the prism added to the lens as a result of continuously twisting the inner surface of the lens in Example 3, where the abscissa indicates the perpendicular position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.
Figure 12:
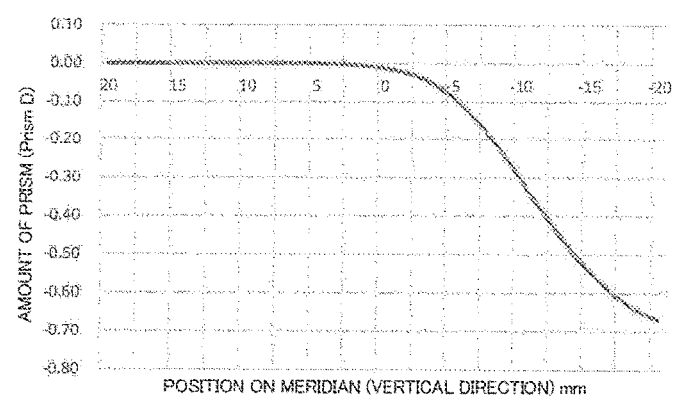
FIG. 12 is a graph depicting an amount of the prism added to the lens as a result of continuously twisting the inner surface of the lens in Example 4, where the abscissa indicates the perpendicular position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 1, but an aspect of continuously adding the base in prism is changed, as depicted in FIG. 11. In concrete terms, the base in prism is continuously added, starting from the fitting point FT (a part passing through the spectacle lens when the user wearing the spectacle lens sees the front (sees infinite distance)).

Instead of the fitting point FT, the distance power measurement point F or the prism power measurement point P may be used.

Figure 17:
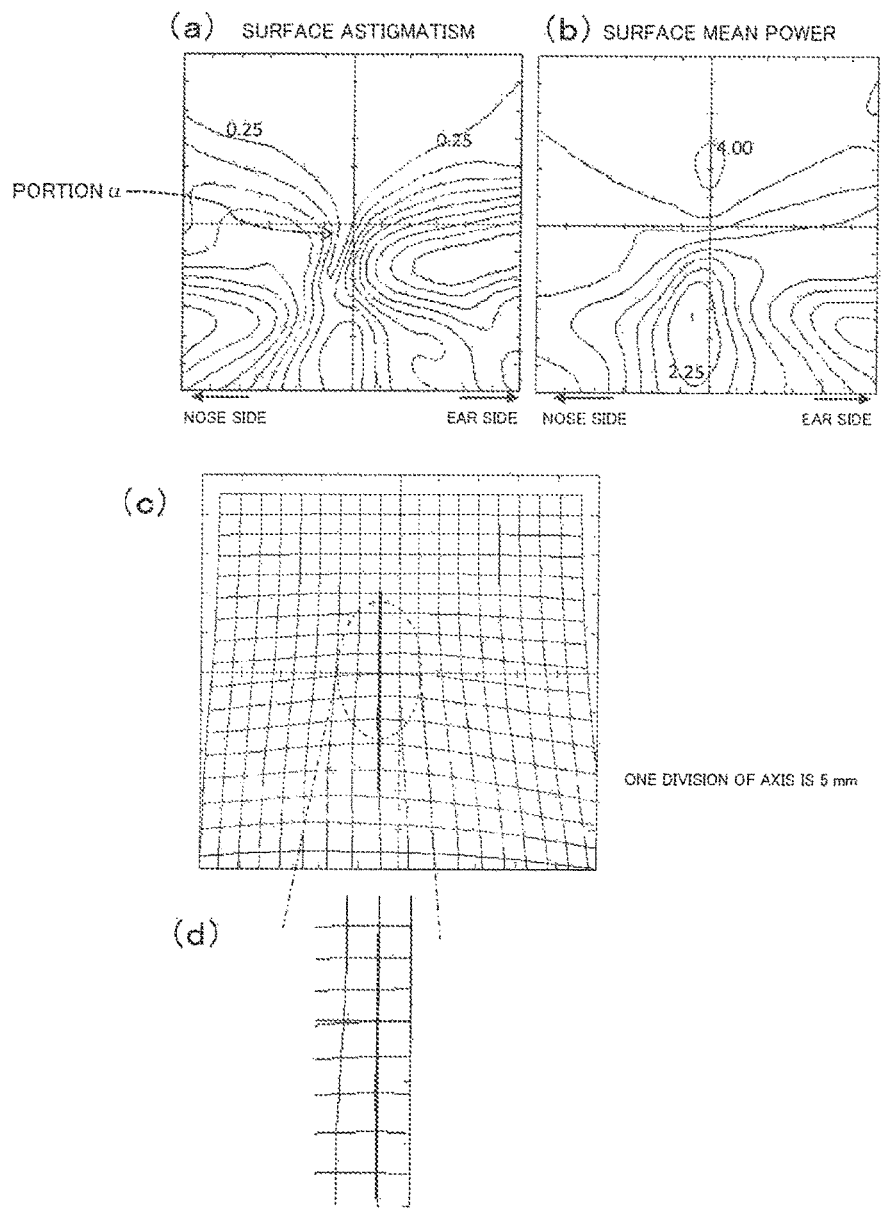
FIG. 17 is a set of diagrams of the spectacle lens according to Example 3, where (a) is a distribution map of a surface astigmatism, (b) is a distribution map of a surface mean power, (c) is a diagram depicting an amount of deflection of a ray following the line of sight when an object is seen through the shape of the inner surface, that is, an amount of prismatic effect, and (d) is an enlarged view of a part of (c).

FIG. 17 is a design information acquired in this example. In FIG. 17(c) and FIG. 17(d), the grid line and the bold line match, extending in the vertical direction in the upper part of the spectacle lens. In other words, an unnecessary convergence can be suppressed in this example as well.

Figure 24:
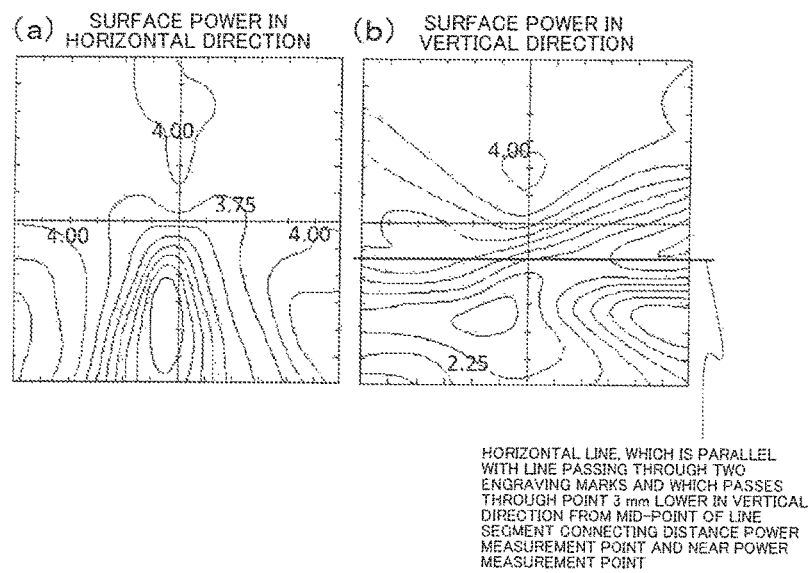
FIG. 24 is a set of diagrams depicting the distribution of a surface power according to Example 3, where (a) is a distribution map of a surface power in the horizontal direction, and (b) is a distribution map of a surface power in the vertical direction.
Figure 30:
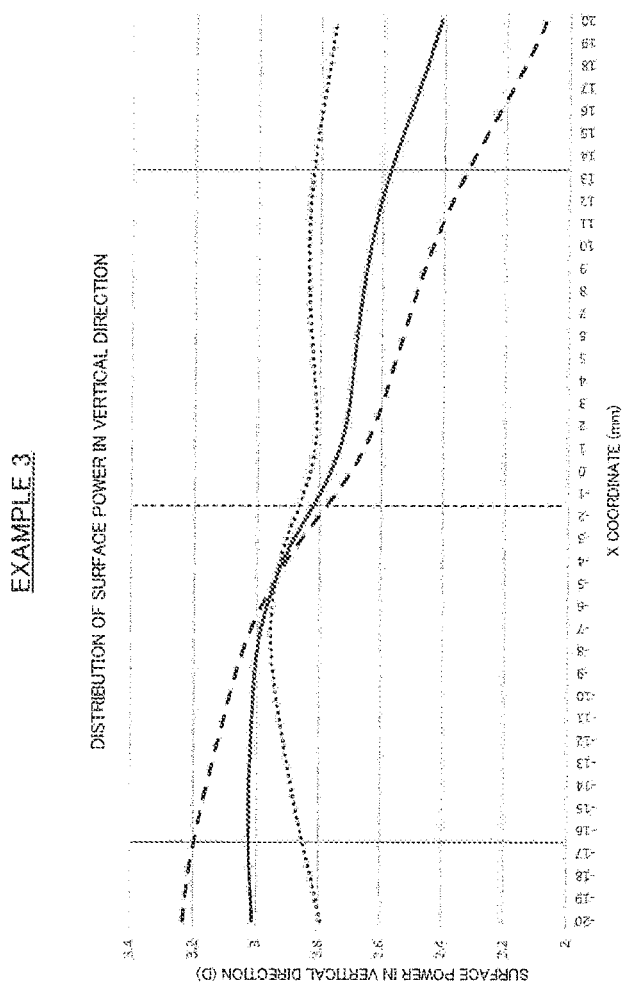
FIG. 30 is a graph on Example 3 and Comparative Example 1, plotting a surface power in the vertical direction on a line which is parallel with the horizontal reference line passing through the two engraving marks imprinted in the spectacle lens in FIG. 3, and which passes through a point 3 mm lower in the vertical direction from the mid-point of the line segment connecting the distance power measurement point and the near power measurement point.

As depicted in FIG. 24(b), which is a distribution map of the surface power in the vertical direction, and FIG. 30 in which the surface power in the vertical direction is plotted, the absolute value of the difference between the surface power values in the ±15 mm positions from the point through which the main line of sight passes, on a line which is parallel with the horizontal reference line passing through the two engraving marks and which passes through a point that is 3 mm lower in the vertical direction from the mid-point of the line segment connecting the distance power measurement point and the near power measurement point, is 0.45 D in the case of Example 3-1 and 0.88 D in the case of Embodiment 3-2, both exceeding the specified 0.25 D value. In this example, the position through which the main line of sight passes is −1.59 mm in the X coordinate in FIG. 30.

Based on the results of Examples 1 to 3, the following can be stipulated.

A shape of continuously twisting at least one of the object side surface and the eyeball side surface of the spectacle lens in the horizontal sectional view of the portion α, in the lower direction of the spectacle lens, is provided to the portion α.

In this state, the absolute value of the difference between the surface power values in the vertical direction in ±15 mm positions from the point through which the main line of sight passes is 0.25 D or more, on a line which is parallel with the horizontal reference line passing through the two engraving marks of the spectacle lens, and which passes through any point on the line segment between the distance power measurement point F and the near power measurement point N.

In addition to this, any point on the line segment connecting the distance power measurement point F and the near power measurement point N is located in a ±3 mm range in the perpendicular direction from the mid-point between the distance power measurement point F and the near power measurement point N.

Example 4

In this example, the shape (shape of the curve itself) of the spectacle lens of Example 1 is deformed on the sides of the portion α. In concrete terms, the base in prism is continuously provided by continuously twisting the inner surface from the prism power measurement point P to the near power measurement point N, similarly to Example 1. The amount of base in prism at the prism power measurement point P is 0, and the amount of base in prism at the near power measurement point N is 0.25Δ (Example 4-1) and 0.50Δ (Example 4-2). Then the shape of the inner surface is gradually deformed on the sides of the portion α so as to be close to the distribution map of the surface astigmatism in FIG. 8(a) according to Comparative Example 1 as a reference example.

Figure 18:
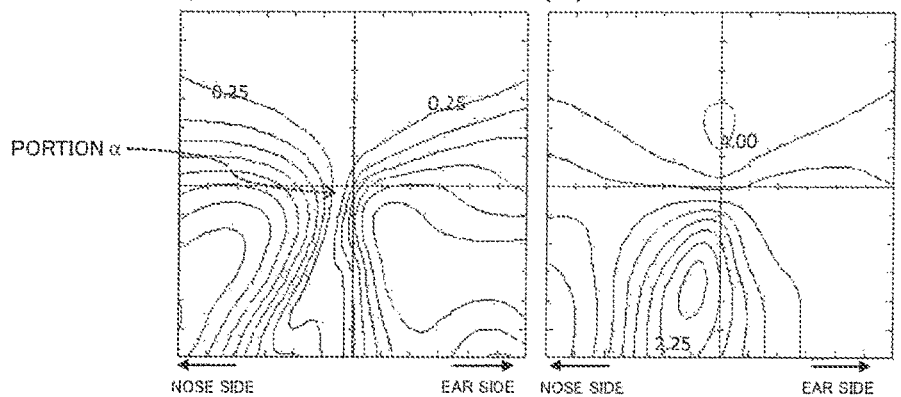
FIG. 18 is a set of diagrams of the spectacle lens according to Example 4, where (a) is a distribution map of a surface astigmatism, (b) is a distribution map of a surface mean power, (c) is a diagram depicting an amount of deflection of a ray following the line of sight when an object is seen through the shape of the inner surface, that is, an amount of prismatic effect, and (d) is an enlarged view of a part of (c).
Figure 18:
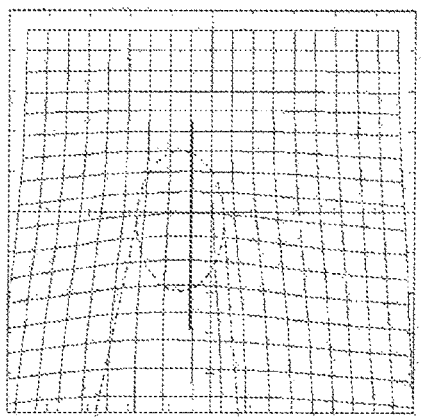
Figure 18:

In Example 4-2, deformation ends when the state in FIG. 18(a) is generated. FIG. 18(b) is a distribution map of the surface mean power of the spectacle lens acquired as the result, FIG. 18(*c*) is a diagram depicting a change of the line of sight when an object is seen through the shape of the inner surface, and FIG. 18(*d*) is an enlarged view of a part of FIG. 18(*c*).

For example, in FIG. 18(*c*), the vertical line (bold line), which is shifted from the origin toward the nose by 2.5 mm, is added. In this example, even if an unintended base out prism is generated in a lower part of the spectacle lens, the base in prism provided to the inner surface of the spectacle lens makes it possible to match the portion corresponding to the bold line on the spectacle lens with the grid line corresponding to this bold line (in other words, the line of sight does not shift in the horizontal direction). Therefore in FIG. 18(*c*) and FIG. 18(*d*), the grid line and the bold line match, extending in the vertical direction in the upper part of the spectacle lens. In other words, an unnecessary convergence can be suppressed in this example.

Further, in the distribution map of the surface astigmatism of this example (FIG. 18(*a*)), the surface astigmatism similar to the distribution map of the surface astigmatism of the progressive surface, before considering the unintended base out prism (Comparative Example 1, FIG. 8(*a*)), is acquired.

Figure 25:
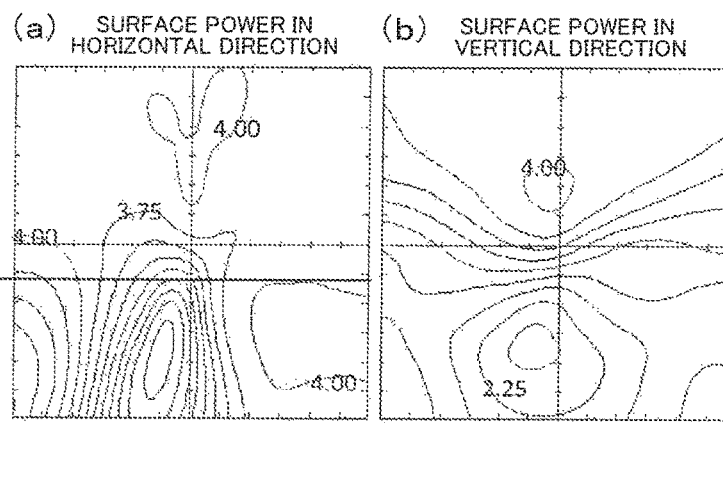
FIG. 25 is a set of diagrams depicting the distribution of a surface power according to Example 4, where (a) is a distribution map of a surface power in the horizontal direction, and (b) is a distribution map of a surface power in the vertical direction.

As depicted in FIG. 25(*a*) which is a distribution map of the surface power in the horizontal direction, and FIG. 31 in which is a surface power in the horizontal direction is plotted, the absolute value of the difference between the surface power values in ±5 mm positions from the point through which the main line of sight passes, on a line which is parallel with the horizontal reference line passing through the two engraving marks, and which passes through a point that is 3 mm lower in the vertical direction from the mid-point of the line segment connecting the distance power measurement point and the near power measurement point, is 0.22 D in the case of Example 4-1, and 0.50 D in the case of Example 4-2, both exceeding the specified 0.12 D value. In this example, the main line of sight is defined as a line segment connecting the distance power measurement point and the near power measurement point, but the position through which the main line of sight passes is −0.9 mm in the X coordinate in FIG. 31.

Example 5

Figure 13:
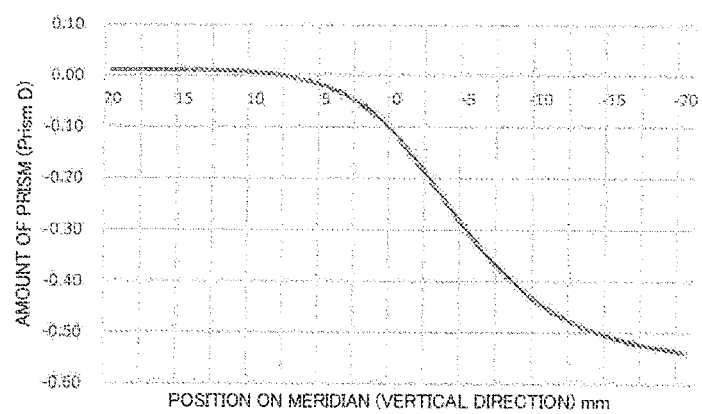
FIG. 13 is a graph depicting an amount of the prism added to the lens as a result of continuously twisting the inner surface of the lens in Example 5, where the abscissa indicates the perpendicular position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 4, but the aspect of continuously adding the base in prism is changed, as depicted in FIG. 13. In concrete terms, the base in prism is continuously added, starting from the mid-position between the distance power measurement point and the prism power measurement point. In FIG. 13, the amount of the addition of the prism, in a part higher than the distance power measurement point F (distance portion), has a positive value (in other words, the base out prism is generated), but in a part lower than the distance power measurement point F (corridor and near portion), the amount of the addition of the prism has a negative value (in other words, the base in prism is generated). Therefore even in the case of adding the prism in FIG. 13, the unintended base out prism generated in a portion where the power continuously changes can be cancelled by the base in prism.

Figure 19:
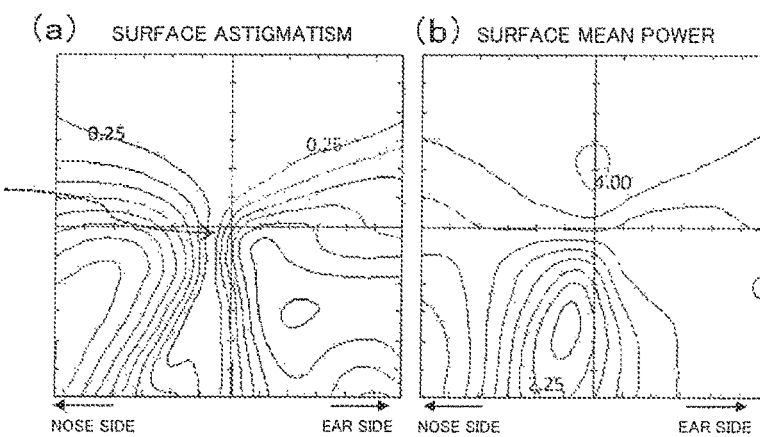
FIG. 19 is a set of diagrams of the spectacle lens according to Example 5, where (a) is a distribution map of a surface astigmatism, (b) is a distribution map of a surface mean power, (c) is a diagram depicting an amount of deflection of a ray following the line of sight when an object is seen through the shape of the inner surface, that is, an amount of prismatic effect, and (d) is an enlarged view of a part of (c).
Figure 19:
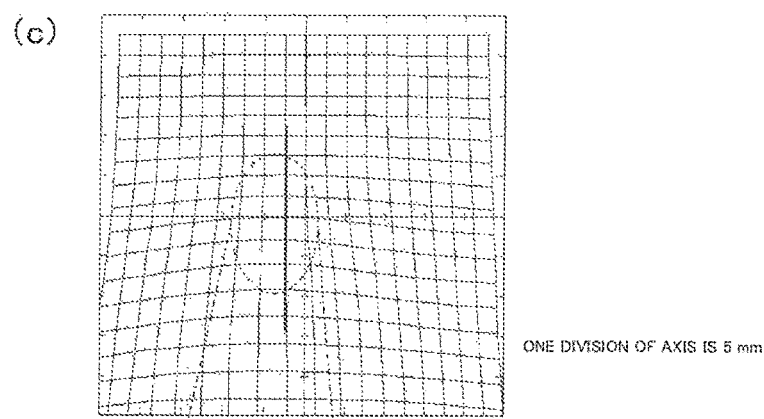
Figure 19:
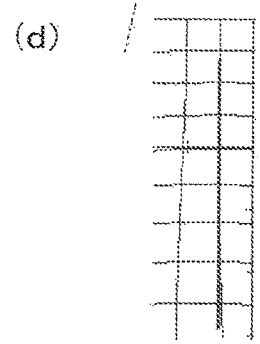

FIG. 19 is a design information acquired in this example. In FIG. 19(*c*) and FIG. 19(*d*), the grid line and the bold line match, extending in the vertical direction, in the upper part of the spectacle lens. In other words, an unnecessary convergence can be suppressed in this example as well.

Figure 26:
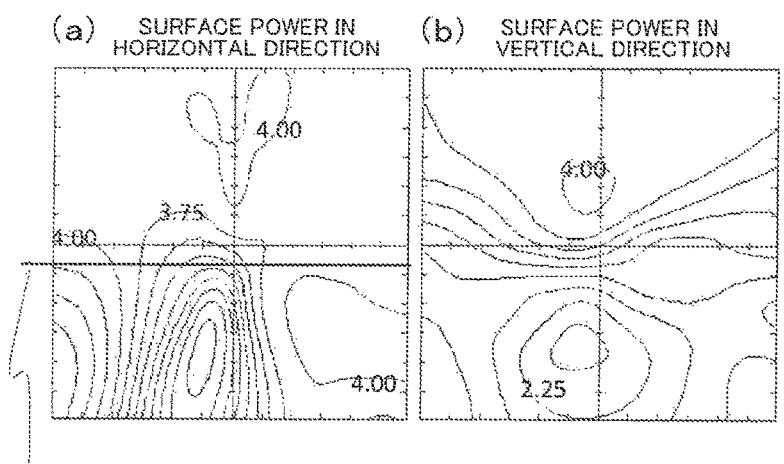
FIG. 26 is a set of diagrams depicting the distribution of a surface power according to Example 5, where (a) is a distribution map of a surface power in the horizontal direction, and (b) is a distribution map of a surface power in the vertical direction.
Figure 32:
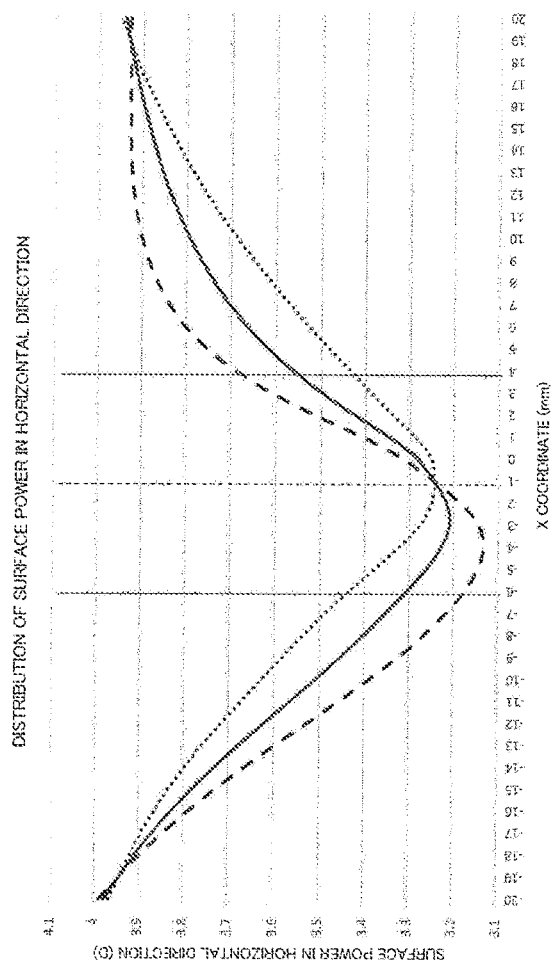
FIG. 32 is a graph on Example 5 and Comparative Example 1, plotting a surface power in the horizontal direction on a line which is parallel with the horizontal reference line passing through the two engraving marks imprinted in the spectacle lens in FIG. 3, and which passes through a mid-point of the line segment connecting the distance power measurement point and the near power measurement point.

As depicted in FIG. 26(*a*), which is a distribution map of the surface power in the horizontal direction, and FIG. 32 in which the surface power in the horizontal direction is plotted, the absolute value of the difference between the surface power values in the ±5 mm positions from the point through which the main line of sight passes, on a line which is parallel with the horizontal reference line passing through the two engraving marks and which passes through the mid-point of the line segment connecting the distance power measurement point and the near power measurement point, is 0.20 D in the case of Example 5-1 and 0.46 D in the case of Example 5-2, both exceeding the specified 0.12 D value. In this example, the position through which the main line of sight passes is −1.25 mm in the X coordinate in FIG. 32.

Example 6

Figure 14:
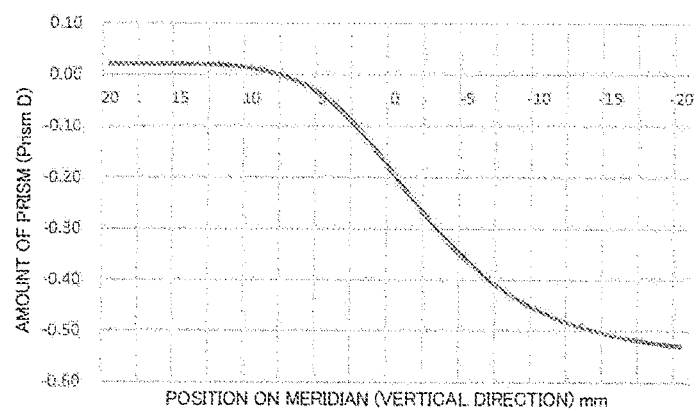
FIG. 14 is a graph depicting an amount of the prism added to the lens as a result of continuously twisting the inner surface of the lens in Example 6, where the abscissa indicates the perpendicular position of a contact between the main line of sight and the inner surface when the origin is an intersection point of a line segment passing through two engraving marks and the main line of sight (positive direction is the upper direction of the spectacle lens, and negative direction is the lower direction of the spectacle lens), and the ordinate indicates the amount of prism that is added.

In this example, the design conditions are the same as Example 4, but the aspect of continuously adding the base in prism is changed, as depicted in FIG. 14. In concrete terms, the base in prism is continuously added, starting from the distance power measurement point. In FIG. 14, the amount of addition of the prism in a part higher than the distance power measurement point F (distance portion) has a positive value, (in other words, the base out prism is generated), but in a part lower than the distance power measurement point F (corridor and near portion), the amount of addition of the prism has a negative value (in other words, the base in prism is generated). Therefore even in the case of the prism that is added as in FIG. 14, the unintended base out prism generated in the portion, where the power continuously changes, can be cancelled by the base in prism.

Figure 20:
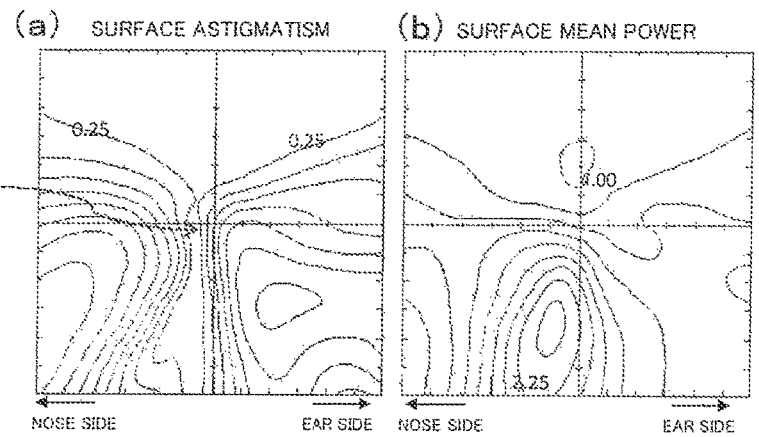
FIG. 20 is a set of diagrams of the spectacle lens according to Example 6, where (a) is a distribution map of a surface astigmatism, (b) is a distribution map of a surface mean power, (c) is a diagram depicting an amount of deflection of a ray following the line of sight when an object is seen through the shape of the inner surface, that is, an amount of prismatic effect, and (d) is an enlarged view of a part of (c).
Figure 20:
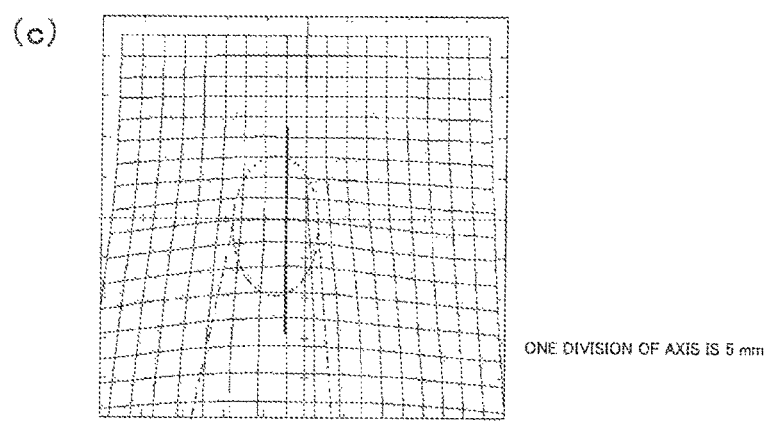
Figure 20:
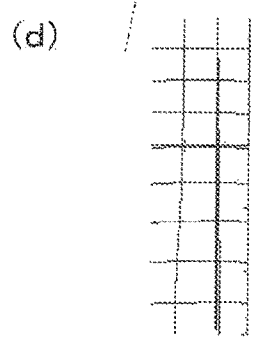

FIG. 20 is a design information acquired in this example. In FIG. 20(*c*) and FIG. 20(*d*), the grid line and the bold line match, extending in the vertical direction, in the upper part of the spectacle lens. In other words, an unnecessary convergence can be suppressed in this example as well.

Figure 27:
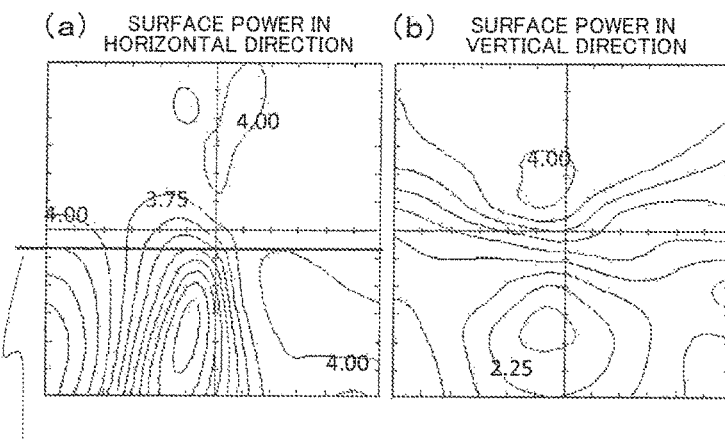
FIG. 27 is a set of diagrams depicting the distribution of a surface power according to Example 6, where (a) is a distribution map of a surface power in the horizontal direction, and (b) is a distribution map of a surface power in the vertical direction.
Figure 33:
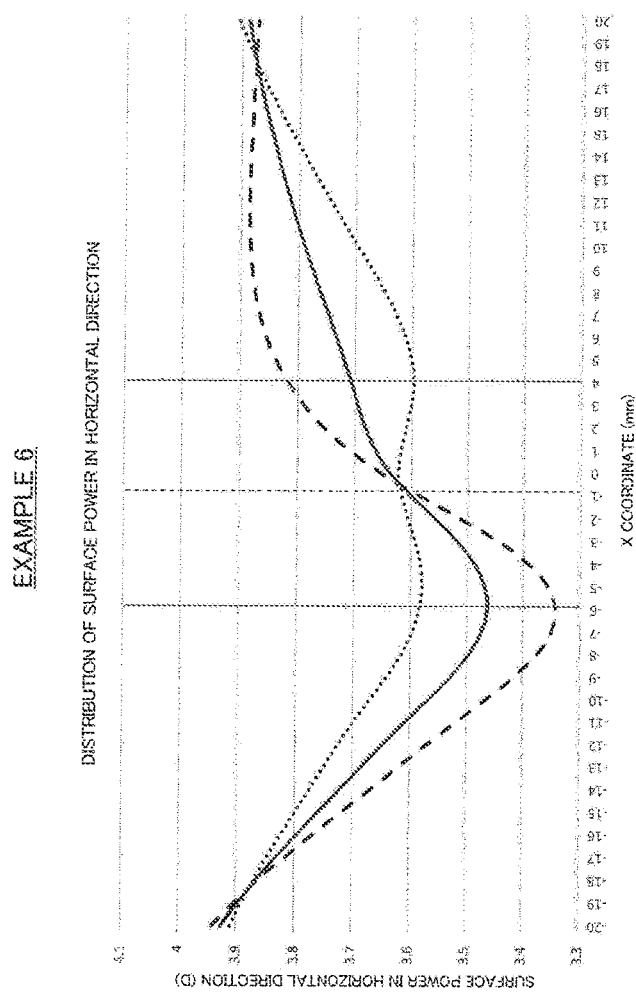
FIG. 33 is a graph on Example 6 and Comparative Example 1, plotting a surface power in the horizontal direction on a line which is parallel with the horizontal reference line passing through the two engraving marks imprinted in the spectacle lens in FIG. 3, and which passes through a point 3 mm higher in the vertical direction from the mid-point of the line segment connecting the distance power measurement point and the near power measurement point.

As depicted in FIG. 27(*a*) which is a distribution map of the surface power in the horizontal direction, and FIG. 33 in which the surface power in the horizontal direction is plotted, the absolute value of the difference between the surface power values in the ±5 mm positions from the point through which the main line of sight passes, on a line which is parallel with the horizontal reference line passing through the two engraving marks, and which passes through a point that is 3 mm higher in the vertical direction from the mid-point of the line segment connecting the distance power measurement point and the near power measurement point, is 0.24 D in the case of Example 6-1 and 0.47 D in the case of Example 6-2, both exceeding the specified 0.12 D value. In this example, the position through which the main line of sight passes is —0.90 mm in the X coordinate in FIG. 33.

Based on the results of Examples 4 to 6, the following can be stipulated.

A shape of continuously (gradually) twisting at least one of the object side surface and the eyeball side surface of the spectacle lens in the horizontal sectional view of the portion α in the lower direction of the spectacle lens is provided to the portion α.

In this state, the absolute value of the difference between the surface power values in the horizontal direction in ±15 mm positions from the point through which the main line of sight passes is 0.12 D or more, on a line which is parallel with the horizontal reference line passing through the two engraving marks of the spectacle lens, and which passes through any point on the line segment between the distance power measurement point F and the near power measurement point N.

In addition to this,
any point on the line segment connecting the distance power measurement point F and the near power measurement point N is located in a ±3 mm range in the perpendicular direction from the mid-point between the distance power measurement point and the near power measurement point.

As a result, according to this example, a technology to suppress unnecessary convergence can be provided, in addition to the above mentioned various effects.

REFERENCE SIGNS LIST

1 Supply system of spectacle lens
20 Optical store side terminal
21 Information storing unit
22 Transmitting/receiving unit
30 Design manufacturer side terminal
31 Receiving unit
32 Designing unit
321 Computing means
33 Determining unit
34 Transmitting unit
4 External server, cloud
5 Public line

The invention claimed is:

1. A spectacle lens, wherein
an inner horizontal direction of the spectacle lens is defined as a direction toward the nose of a user who wears the spectacle lens, and an outer horizontal direction of the spectacle lens is defined as a direction toward an ear of the user,
an upper direction of the spectacle lens is defined as a direction toward a top of the spectacle lens when the user wears the spectacle lens, and a lower direction of the spectacle lens is defined as a direction toward a bottom of the spectacle lens,
a shape of a base in prism is formed in a portion in which power continuously changes and through which a main line of sight influenced by convergence of the user of the spectacle lens passes, such that at least a part of a base out prism, which may be generated in the portion, is cancelled,
the shape of the base prism is formed such that at least a apart of the portion of the spectacle lens includes a shape of continuous twisting at least a shape of one of an object side surface and an eyeball side surface of the spectacle lens in a horizontal cross-sectional view of the portion, in the lower direction so that an amount of the base in prism increases in the lower direction, and
an absolute value of a difference between surface power values in a vertical direction in ±15 mm positions from the point through which the main line of sight passes is 0.25 D or more, on a horizontal line which is parallel with a line passing through two engraving marks of the spectacle lens, and which passes through any point on a line segment connecting a specific distance power measurement point and a near power measurement point.

2. The spectacle lens according to claim 1, wherein
the spectacle lens includes a portion for viewing an object at a specific distance, a near portion for viewing an object at a distance nearer than the specific distance, and a corridor which is between the portion and the near portion and in which the power changes, the spectacle lens satisfying the following equation:

$$P_N - P_F < ADD * h/10$$

where $P_F$ denotes an amount of prism (Δ) at a power measurement point of the portion for viewing an object at a specific distance, and $P_N$ denotes an amount of prism (Δ) at a near power measurement point, the amount of prism indicates a positive value in a case of a base out prism, and a negative value in a case of a base in prism; and ADD denotes an addition power (D), and h denotes an amount of inset (mm) in the spectacle lens, in which a positive direction is toward the nose and a negative direction is toward the ear, with respect to a vertical line connecting an upper vertex and a lower vertex of the spectacle lens.

3. The spectacle lens according to claim 2, wherein the spectacle lens satisfies the following equation:

$$|P_N - P_F - ADD * h/10| \geq 0.25.$$

4. The spectacle lens according to claim 1, wherein
any point on the line segment connecting the specific distance power measurement point and the near power measurement point is located in a ±3 mm range in a perpendicular direction from a mid-point between the specific distance power measurement point and the near power measurement point.

5. The spectacle lens according to claim 1, wherein
an absolute value of a difference between surface power values in the horizontal direction in ±5 mm positions from the point through which the main line of sight passes is 0.12 D or more, on a horizontal line which is parallel with a line passing through two engraving marks of the spectacle lens, and which passes through any point on a line segment connecting the specific distance power measurement point and the near power measurement point.

6. The spectacle lens according to claim 5, wherein
any point on the line segment connecting the specific distance power measurement point and the near power measurement point is located in a ±3 mm range in the perpendicular direction from a mid-point between the specific distance power measurement point and the near power measurement point.

7. The spectacle lens according to claim 1, wherein
the shape of the base in prism is also formed in an outer part and inner part in the horizontal direction from the portion of the spectacle lens.

8. The spectacle lens according to claim 7, wherein
an absolute value of a difference between surface power values in the vertical direction in ±15 mm positions from the point through which the main line of sight passes is 0.25 D or more, on a horizontal line which is parallel with a line passing through two engraving marks of the spectacle lens, and which passes through a point that is 3 mm higher in the vertical direction from a mid-point of the line segment connecting the specific distance power measurement point and the near power measurement point.

9. The spectacle lens according to claim 7, wherein
an absolute value of a difference between surface power values in the vertical direction in ±15 mm positions from the point through which the main line of sight passes is 0.25 D or more, on a horizontal line which is parallel with a line passing through two engraving marks of the spectacle lens, and which passes through a mid-point of the line segment connecting the specific distance power measurement point and the near power measurement point.

10. The spectacle lens according to claim 7, wherein
an absolute value of a difference between surface power values in the vertical direction in ±15 mm positions from the point through which the main line of sight passes is 0.25 D or more, on a horizontal line which is parallel with a line passing through two engraving marks of the spectacle lens, and which passes through a point that is 3 mm lower in the vertical direction from a mid-point of the line segment connecting the specific distance power measurement point and the near power measurement point.

11. The spectacle lens according to claim 1, wherein
the amount of the base in prism is decreased in the outer horizontal direction and the inner horizontal direction from the portion of the spectacle lens.

12. The spectacle lens according to claim 11, wherein
an absolute value of a difference between surface power values in the horizontal direction in ±5 mm positions from the point through which the main line of sight passes is 0.12 D or more, on a horizontal line which is parallel with a line passing through two engraving marks of the spectacle lens, and which passes through a point that is 3 mm lower in the vertical direction from a mid-point of the line segment connecting the specific distance power measurement point and the near power measurement point.

13. The spectacle lens according to claim 11, wherein
an absolute value of a difference between surface power values in the horizontal direction in ±5 mm positions from the point through which the main line of sight passes is 0.12 D or more, on a horizontal line which is parallel with a line passes through two engraving marks of the spectacle lens, and which passes through a mid-point of the line segment connecting the specific distance power measurement point and the near power measurement point.

14. The spectacle lens according to claim 11, wherein
an absolute value of a difference between surface power values in the horizontal direction in ±5 mm positions from the point through which the main line of sight passes is 0.12 D or more, on a horizontal line which is parallel with a line passing through two engraving marks of the spectacle lens, and which passes through a point that is 3 mm higher in the vertical direction from a mid-point of the line segment connecting the specific distance power measurement point and the near power measurement point.

15. A manufacturing method for a spectacle lens, wherein an inner horizontal direction of the spectacle lens is defined as a direction toward the nose of a user who wears the spectacle lens and an outer horizontal direction of the spectacle lens is defined as a direction toward an ear of the user, an upper direction of the spectacle lens is defined as a direction toward a top of the spectacle lens when the user wears the spectacle lens, and a lower direction of the spectacle lens is defined as a direction toward a bottom of the spectacle lens, the method comprising:
a designing step of forming a shape of a base in prism to a portion in which power continuously changes and through which a main line of sight, influenced by convergence of a user of the spectacle lens, passes such that at least a part of a base out prism, which may be generated in the portion, is cancelled; and
a manufacturing step of manufacturing the spectacle lens based on a result of the designing step,
wherein the shape of the base in prism is formed such that at least a part of the portion of the spectacle lens includes a shape of continuously twisting at least a shape of one of an object side surface and an eyeball side surface of the spectacle lens in a horizontal cross-sectional view of the portion, in the lower direction, so that an amount of the base in prism increases in the lower direction, and
an absolute value of a difference between surface power values in a vertical direction in ±15 mm positions from the point through which the main line of sight passes is 0.25 D or more, on a horizontal line Which is parallel with a line passing through two engraving marks of the spectacle lens, and which passes through any point on a line segment connecting a specific distance power measurement point and a near measurement point.

16. A supply system of a spectacle lens, wherein an inner horizontal direction of the spectacle lens is defined as a direction toward the nose of a user who wears the spectacle lens and an outer horizontal direction of the spectacle lens is defined as a direction toward an ear of the user, an upper direction of the spectacle lens is defined as a direction toward a top of the spectacle lens when the user wears the spectacle lens, and a lower direction of the spectacle lens is defined as a direction toward a bottom of the spectacle lens, the supply system comprising:
a receiving unit configured to receive information on the spectacle lens;
a designing unit configured to form a shape of a base in prism in a portion in which power continuously changes and through which a main line of sight, influenced by convergence of a user of the spectacle lens, passes such that at least a part of a base out prism, which may be generated in the portion, is cancelled; and
a transmitting unit configured to transmit design information that is acquired by the designing unit,
wherein the shape of the base in prism is formed such that at least a part of the portion of the spectacle lens includes a shape of continuously twisting at least a shape of one of an object side surface and an eyeball side surface of the spectacle lens in a horizontal cross-sectional, view of the portion, in the lower direction, so that an amount of the base in prism increases in the lower direction, and
an absolute value of a difference between surface power values in a vertical direction in ±15 mm positions from the point through which the main line of sight passes is 0.25 D or more, on a horizontal line which is parallel with a line passing through two engraving marks of the spectacle lens, and which passes through any point on a line segment connecting a specific distance power measurement point and a near power measurement point.

17. A non-transitory computer readable medium storing a program causing a computer to execute a process for processing information of a spectacle lens, an inner horizontal direction of the spectacle lens being defined as a direction toward the nose of a user who wears the spectacle lens and an outer horizontal direction of the spectacle lens being defined as a direction toward an ear of the user, an upper direction of the spectacle lens is defined as a direction toward a top of the spectacle lens when the user wears the spectacle lens, and a lower direction of the spectacle lens is defined as a direction toward a bottom of the spectacle lens, the process comprising:
a receiving unit configured to receive information on the spectacle lens;

a designing unit configured to form a shape of a base in prism in a portion in which power continuously changes and through which a main line of sight, influenced by convergence of the user of the spectacle lens, passes such that at least a part of a base out prism, which may be generated in the portion, is cancelled; and a transmitting unit configured to transmit design information that is acquired by the designing unit, wherein the shape of the base in prism is formed such that at least a part of the portion of the spectacle lens includes a shape of continuously twisting at least a shape of one of an object side surface and an eyeball side surface of the spectacle lens in a horizontal cross-sectional view of the portion, in the lower direction, so that an amount of the base in prism increases in the lower direction, and an absolute value of a difference between surface power values in a vertical direction in ±15 mm positions from the point through which the main line of sight passes is 0.25 D or more, on a horizontal line which is parallel with a line passing through two engraving marks of the spectacle lens, and which passes through any point on a line segment connecting a specific distance power measurement point and a near power measurement point.

* * * * *